US011240649B2

(12) United States Patent
Heller

(10) Patent No.: US 11,240,649 B2
(45) Date of Patent: Feb. 1, 2022

(54) REAL-TIME ADAPTIVE FACILITY DEPLOYMENT

(71) Applicant: GOOD2GO, INC., San Francisco, CA (US)

(72) Inventor: Frances Heller, San Francisco, CA (US)

(73) Assignee: GOOD2GO, INC., San Francisco, CA (US)

(*) Notice: Subject to any disclaimer, the term of this patent is extended or adjusted under 35 U.S.C. 154(b) by 336 days.

(21) Appl. No.: 16/555,532

(22) Filed: Aug. 29, 2019

(65) Prior Publication Data
US 2020/0077243 A1 Mar. 5, 2020

Related U.S. Application Data

(60) Provisional application No. 62/725,472, filed on Aug. 31, 2018.

(51) Int. Cl.
H04W 4/48 (2018.01)
G06F 21/35 (2013.01)
G01C 21/34 (2006.01)
G05D 1/02 (2020.01)
H04W 4/021 (2018.01)
H04W 72/08 (2009.01)
G05D 1/00 (2006.01)
H04W 12/06 (2021.01)

(52) U.S. Cl.
CPC .......... H04W 4/48 (2018.02); G01C 21/3438 (2013.01); G01C 21/3492 (2013.01); G05D 1/0022 (2013.01); G05D 1/0276 (2013.01); G06F 21/35 (2013.01); H04W 4/021 (2013.01); H04W 12/06 (2013.01); H04W 72/087 (2013.01)

(58) Field of Classification Search
CPC ..... H04W 4/48; H04W 12/06; H04W 72/087; H04W 4/021; G01C 21/3438; G01C 21/3492; G05D 1/0022; G05D 1/0276; G06F 21/35
See application file for complete search history.

(56) References Cited

U.S. PATENT DOCUMENTS 7,822,406 B2 * 10/2010 Lee ................... H04W 12/065
455/411
8,056,802 B2 * 11/2011 Gressel ................. G07C 9/22
235/382

(Continued)

Primary Examiner — Luis A Martinez Borrero
(74) Attorney, Agent, or Firm — Ulmer & Berne LLP

(57) ABSTRACT

A system allows an end-user to locate and gain access to an access-controlled facility or resource, such as a restroom, phone charging station, or Wi-Fi hot spot. Some implementations of the system monitor the formation and concentration of individuals into crowds that may place a higher demand on facilities and resources located near the crowd. The system may distribute mobile facilities to areas that offer convenient access to potential developing crowds, and when the system determines that there is a disparity between available resources and crowd demand reaches a certain level it may deploy one or more mobile facilities to positions proximate to that crowd. A mobile facility may also be requested on demand by a user or organizer, and some implementations provide cost sharing mechanisms and other user benefits related to requesting and accessing the facility.

17 Claims, 13 Drawing Sheets

(56) References Cited

U.S. PATENT DOCUMENTS

| | | | |
|---|---|---|---|
| 8,588,809 B2* | 11/2013 | Seavey | G09B 29/007 |
| | | | 455/456.1 |
| 8,903,425 B2* | 12/2014 | Guenec | G06Q 10/02 |
| | | | 455/456.3 |
| 8,970,391 B2* | 3/2015 | Hoekstra | G06Q 10/00 |
| | | | 340/870.01 |
| 9,247,520 B2* | 1/2016 | Malik | H04W 64/00 |
| 9,584,252 B1* | 2/2017 | Salyers | H04W 12/08 |
| 9,681,360 B1* | 6/2017 | Salyers | H04M 1/72463 |
| 9,984,520 B1* | 5/2018 | Heller | G07C 9/00571 |
| 10,185,921 B1* | 1/2019 | Heller | G07C 9/38 |
| 10,405,184 B2* | 9/2019 | Gallagher | H04W 12/082 |
| 10,565,531 B1* | 2/2020 | Heller | G07C 9/21 |
| 10,607,492 B2* | 3/2020 | VanderZanden | G08G 1/202 |
| 10,943,420 B1* | 3/2021 | Heller | G07C 9/00896 |
| 10,944,828 B2* | 3/2021 | Heller | H04L 67/18 |
| 11,055,943 B2* | 7/2021 | Valder | G07C 9/23 |
| 2008/0191009 A1* | 8/2008 | Gressel | H04W 4/021 |
| | | | 235/382 |
| 2009/0157467 A1* | 6/2009 | Braxton | E04H 1/1216 |
| | | | 705/7.12 |
| 2015/0106150 A1* | 4/2015 | Soleimani | G06Q 10/1095 |
| | | | 705/7.19 |
| 2017/0094521 A1* | 3/2017 | Salyers | H04W 8/205 |
| 2017/0094534 A1* | 3/2017 | Salyers | H04W 48/04 |
| 2017/0331827 A1* | 11/2017 | Salyers | H04W 16/20 |
| 2018/0089916 A1* | 3/2018 | Drako | H04W 4/021 |
| 2018/0096544 A1* | 4/2018 | James | G07C 9/28 |
| 2018/0218310 A1* | 8/2018 | Hansmann | H04W 12/06 |
| 2018/0220301 A1* | 8/2018 | Gallagher | H04W 4/021 |
| 2018/0259976 A1* | 9/2018 | Williams | G01C 21/32 |
| 2019/0033856 A1* | 1/2019 | Ferguson | G06Q 10/06315 |
| 2019/0311630 A1* | 10/2019 | VanderZanden | G08G 1/202 |
| 2019/0387058 A1* | 12/2019 | Heller | H04L 67/1002 |
| 2020/0258393 A1* | 8/2020 | VanderZanden | G01C 21/3667 |

* cited by examiner

REAL-TIME ADAPTIVE FACILITY DEPLOYMENT

PRIORITY

This application is a non-provisional of and claims priority to U.S. Provisional Patent 62/725,472, filed Aug. 31, 2018, and titled Real-Time Adaptive Facility Deployment, the entirety of which is hereby incorporated by reference.

FIELD

The disclosed technology pertains to a system for providing a user with increased access to a facility, or one or more resources within a facility, or both.

BACKGROUND

Travelers and locals want certainty, convenience and quality when searching for a facility or service, such as a restroom or other kind of facility. In some instances, consumers may pretend that they are legitimate customers in order to gain access to a retailer or hotel in order to avoid using a publicly available facility, due to concerns about cleanliness, maintenance, and safety. Over time, vendor locations such as coffee shops, cafes, gas stations, grocers, and other retailers in areas with heavy foot traffic may become "de facto" public restrooms. Allowing the general public access to private business facilities may create additional costs and risks, as well as concerns about controlling access without seemingly discriminatory policies, while giving the private facility no real benefit. Additionally, dealing with consumers that are unsure if they are welcome to use a given facility or not may lead to repeated awkward time-consuming interactions between consumers and vendor employees, alienating potential customers and harming the efficiency of employees.

These problems can be amplified due to special events or other circumstances occurring within a city or community. For example, a concert or sporting event at a football stadium can concentrate a hundred thousand spectators within a relatively small area of a city, while an annual fireworks display, music festival, or food festival can draw a half a million visitors or more. These attendees are often drawn from neighboring cities and may be unfamiliar with the areas and customs in and around the venue. This high concentration of visitors can create a burden on local businesses and other facilities as they seek out restrooms, air-conditioned areas, water fountains, phone charging stations, internet hotspots, and other resources that may be needed.

Such congestion and inconvenience can occur even in the absence of large-scale sporting events or festivals, making it difficult for increased access to such resources to be arranged for. Whether randomly or due to small or unpredictable events such as road closures, traffic accidents, retail sales events, political events, and other activities, crowds of various sizes can often be concentrated into an area and increase the need for resources in that area, and correspondingly increase the burdens on nearby businesses.

What is needed, therefore, is an improved system for anticipating and responding to increased need for resources within an area and managing consumer access to such resources.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

Figure 1:
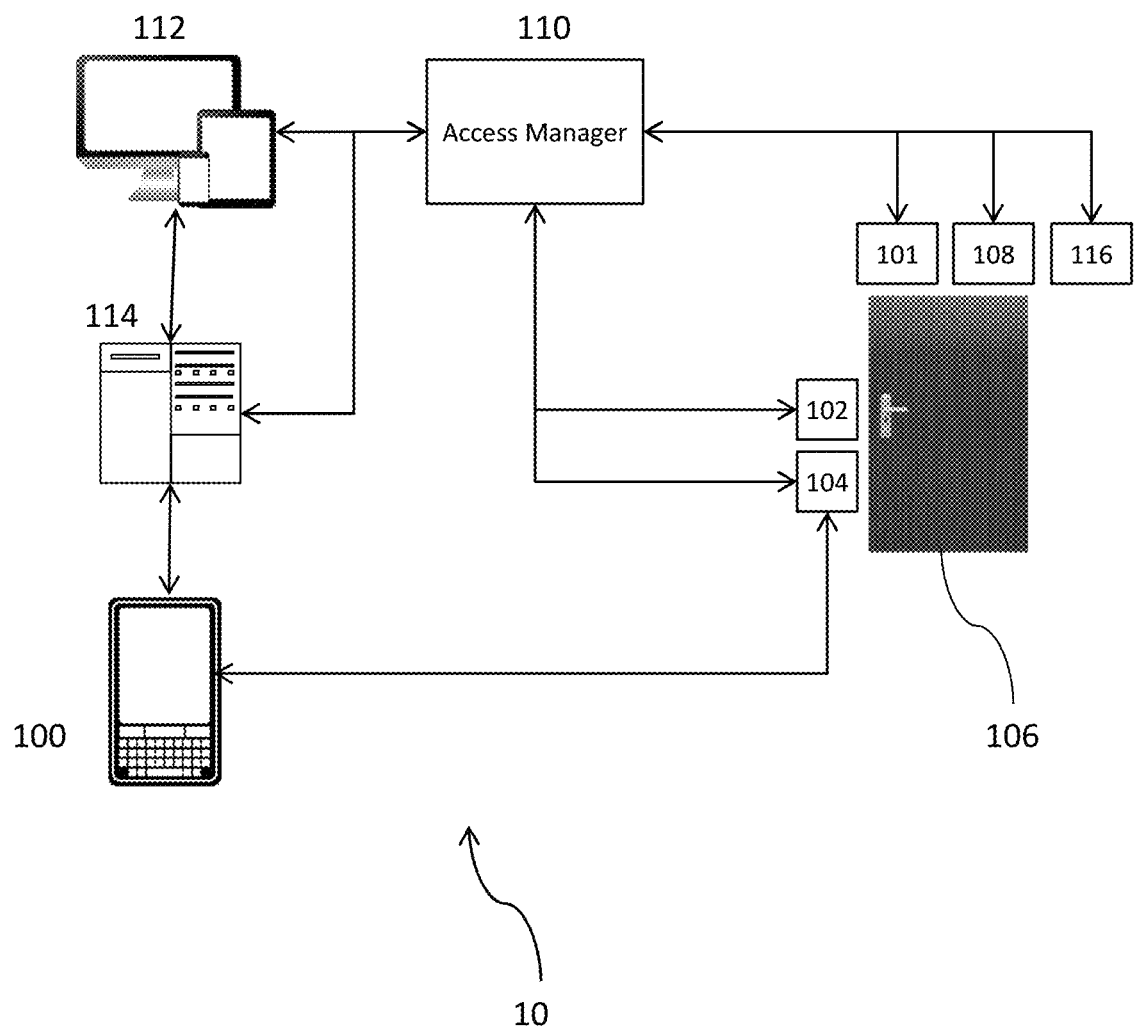
FIG. 1 shows a schematic diagram of an exemplary system for managing access to a private facility.

The inventors have conceived of novel technology that, for the purpose of illustration, is disclosed herein as applied in the context of a system for managing user access to a private facility, such as a restroom, resources at a private or public facility, or both. While the disclosed applications of the inventors' technology satisfy a long-felt but unmet need in the art of systems for managing access to a private facility, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only and should not be treated as limiting. It is contemplated that the teachings herein may be readily applied to various other contexts, including contexts that do not necessarily involve a restroom or similar facility. The example of a restroom as a private facility is being provided herein as just one merely illustrative example.

As used herein, a "private facility" should be understood to include an area or resource for which there is some restriction on the access or use of Examples may include a restroom, a shower, a parking garage, an office building, etc. A private facility may thus include an area with physical access controls such as a room secured by a locked door; but may also include an area with "soft" access controls such as a parking space for which entry is not physically barred, but in which a person may not be authorized to park except under certain conditions. Similarly, a private facility could be a room that is publicly accessible, but which contains resources that may have some restrictions placed on their use. This could include tangible devices such as, for example, a phone charging station that is inoperable until activated by an authorized user or a tire filling station that is inoperable until activated, but could also include more abstract resources such as a semi-automated ordering system that may be accessed by an authorized user to place an order for food or drink, or a semi-automated system for requesting or reserving services that may be accessed by an authorized user to reserve a dining table or parking spot. Private facilities may be permanently private, such as a restroom at a private establishment; or may only be temporarily private, such as a park or festival ground for which access is only controlled certain weekends during a year as a result of certain events. In other words, an otherwise public facility may be rendered at least partially "private" when access to at least a portion of the facility is at least partially restricted for at least some period of time. The foregoing examples of facilities are merely illustrative and are not intended to be limiting in any way. Various other suitable kinds of facilities will be apparent to those of ordinary skill in the art in view of the teachings herein.

Also as used herein, a "resource" should be understood to include hardware or other objects (e.g., a faucet, a toilet, a charging station, an elevator, etc.); people (e.g., a cashier, a person whom an invitee is scheduled to meet, etc.); and transactions (e.g., purchase of a cup of coffee or some other good, a request for service, etc.). The foregoing examples of resources are merely illustrative and are not intended to be limiting in any way. Various other suitable kinds of resources will be apparent to those of ordinary skill in the art in view of the teachings herein.

I. Exemplary System and Method for Managing Access to Resources

Turning now to FIG. 1, that figure shows an exemplary system (10) for managing access to a private facility or resource. Particular implementations of systems such as the system (10) may have varying combinations of the shown components. In the example shown in FIG. 1, a user device (100) is communicatively coupled with an access server (114) via a long or mid-range wireless connection, such as a cellular data network or local Wi-Fi network that provides the user device (100) connectivity to the access server (114) via the internet. The user device (100) may be, for example, a smartphone, tablet, laptop, kiosk device, or other similar device having capabilities such as storing, exchanging, and processing data and information, receiving user inputs and providing information to a user, communicating with other devices wirelessly, and executing software applications. The access server (114) may be a physical or virtual server, located at the facility or elsewhere, and configured to store data describing various resources or facilities that the user device (100) may request access to, and authentication data for verifying that the user device (100) should be granted access to resources or facilities. The user device (100) may be granted access in a variety of circumstances, such as where the user device (100) is associated with a subscription or other pre-purchased access to the facility. The access server (114) may also be configured to manage wait times, availability notifications, service requests, customer feedback, and other similar information and features associated with the access and use of resources or facilities.

User device (100) may also communicate with an access panel (104) via short range wireless communications such as Bluetooth, NFC, RFID detection, infrared, or the access panel (104) may receive identifying data via other means, such as voice or facial recognition, or other means for communicating data wirelessly or hands free. The access panel (104) is located proximately to the desired resource or facility, and interactions between the user device (100) and the access panel (104) can serve as an indicator of a requester's arrival at or proximity to the resource or facility. In the present example, a facility is shown with a facility door (106), but it should be understood that not all facilities will have a facility door (106) or other physical access barriers. For example, while a restroom facility may have a facility door (106), an alternate facility such as a parking facility or office may not, and may instead have access control features specific to devices or structures within that environment, such as, for example, a turnstile, gate, elevator, or arm, located at an entrance to the facility. As used herein, a facility door, for example, facility door (106), may be a physical door or any other barrier-to-access appropriate for accessing the desired facility.

An access manager (110) may be a physical or virtual device or server located at the facility or elsewhere and coupled with one or more devices at the facility. The access manager (110) may be configured to control and operate connected devices based upon communications from the access server (114). In some implementations, the access manager (110) and the access server (114) may be configured on the same physical or virtual server and may also be combined with one or more features of the access panel (104) into a single physical device. In other implementations, the access manager (110) may be eliminated altogether, and any features or actions it provides may instead be handled by a different device, as will be apparent to one of ordinary skill in the art in light of the disclosure herein.

An automatic opener (101) may be installed with the facility door (106) so that when a communication is received from the access manager (110) indicating the facility should be opened, the automatic opener (101) can activate and open the facility door (106). An automatic locking mechanism (102) may be installed with the facility door (106) so that when a communication is received from the access manager (110) the automatic locking mechanism (102) can be latched or unlatched as required. The access panel (104) may be installed near the door and communicate with the user device (100) to verify a user's arrival at the facility. Interaction between the user device (100) and the access panel (104) may result in a communication to the access manager (110) and, for example, cause the automatic locking mechanism (102) to unlatch and the door opener (101) to open the door.

As has been discussed, a facility may have a set of facility user devices (116) that may include a variety of devices and fixtures, such as a vacuum cleaner, tire inflator, air conditioner, car wash soap and water sprayer, audio device, video device, computer, sink, shower or toilet water supply, soap dispenser, product dispenser, sample dispenser, communication device, Wi-Fi access point, charging station, power supply, massage chair, or other similar device. The facility user devices (116) may be enabled and disabled based upon a communication from the access manager (110). The facility user devices (116) may be in an access-controlled facility (e.g., a facility with the facility door (106)), or may be in an open area (e.g., a number of phone charging plugs on a phone charging kiosk in a public area).

As an exemplary use of the system (10), a restroom may be located at a private business, such as a coffee shop. After requesting access via the access server (114), the user device (100) could be placed within the proximity of the facility access panel (104) located proximately to the restroom. The user device (100) could retrieve a unique identifier or authentication code from the access server (114) and communicate the authentication code to the access panel (104), which can communicate the authentication code to one or more of the access manager (110) and access server (114), verifying that the user device (100) is both present at the facility, and authorized to access the facility. With verification complete, the access manager (110) can unlatch the automatic locking mechanism (102), open the facility door (106) via the automatic opener (101), and enable the facility user devices (116), such as the water supply for the toilet and sink, the restroom lights, an air circulator, a television or radio, or a partner product sample dispenser.

When the user exits the restroom, the user device (100) may interface with the facility access panel (104) or the access server (114) to notify access manager (110) that the facility is now empty, causing the door opener (101) to close the door, the automatic locking mechanism (102) to latch, and the facility user devices (116) to be disabled. A motion detector (108) may provide verification to the access manager (110) that the facility is in fact vacant before closing and locking the facility, or may be used to trigger actions after a passage of time with no motion, in the event that a user exits the facility, so that the facility may be secured at all times when not in use.

The above described devices in communication with the access manager (110) may also be actuated, enabled, disabled, triggered, or otherwise manipulated via a facility device (112) or the access server (114). The facility device (112) may be a smartphone, tablet, computer, or kiosk configured for use at the facility in order to manage users' interaction with the resource or facility. For example, the facility device (112) may be a tablet in possession of a cashier that may be used to manually unlock, open, or enable a facility to allow someone without the user device (100) to access the facility. Such access could also be granted by way of activating a disposable card with an embedded RFID or other indicator that can be detected by the facility access panel (104) to grant access. A temporary access card could be activated via the facility device (112) and configured to allow access a certain number of times, or over a certain period of time. Similarly, the access server (114) could communicate to access manager (110) and trigger any of the devices. Such functionality could allow the access server (114) to remotely grant access to a cleaner or technician without interrupting the facility vendor's employees, could be used to disable all access to a facility in the event of a major maintenance need, or could be used to test the connected facility devices for operational status and performance.

FIG. 1 shows one example of a possible configuration of systems, devices, and functionality, and it should be understood that various different configurations may be desirable as has been described and as will be apparent to one of ordinary skill in the art in light of this disclosure. In particular, some facilities may not have the facility door (106), the automatic locking mechanism (102), the access panel (104), the automatic opener (101), the motion detector (108), or the facility user devices (116).

It should also be understood that the system (10) could be configured for use in both permanent, semi-permanent, or mobile facilities. This could be useful at any place where resources are restricted, such as for example, at an outdoor concert venue, fairground, worksite, farmer's market, or other area where temporarily deployed, access-controlled facilities may be useful. By way of example only, a private facility as described herein may include a mobile restroom or similar mobile structure where private access may be desired. It should also be understood that a single location may support multiple virtual queues managing access to multiple resources. For example, when implemented at a fairground there may be multiple virtual queues managing access to multiple restrooms, vendors, carnival rides, and other resources simultaneously and within the same general proximity. Other variations in method of granting access to a facility and hardware configuration and components exist and will be apparent to one of ordinary skill in the art in light of this disclosure.

Figure 2:
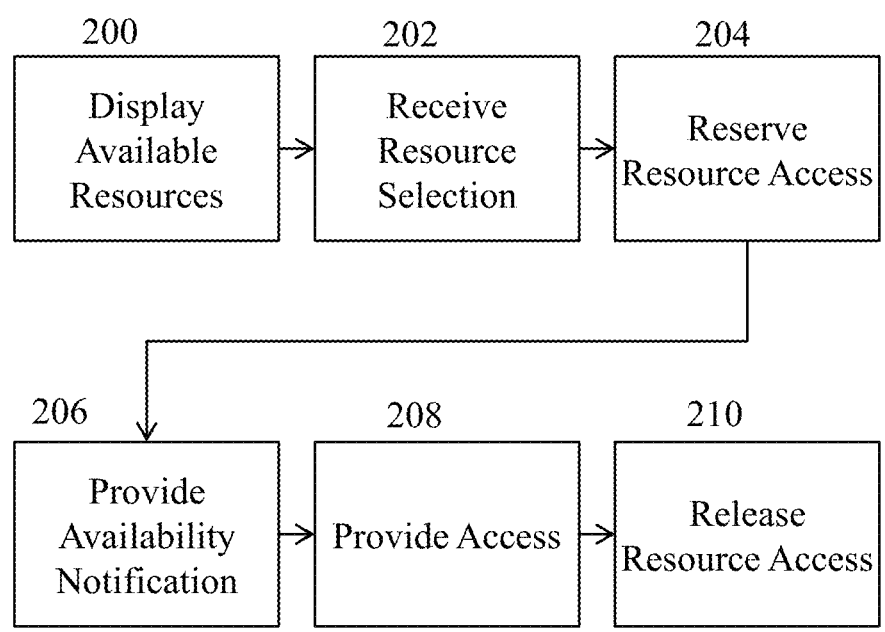
FIG. 2 shows a flowchart of an exemplary set of high-level steps that the system of FIG. 1 could perform to manage user interactions with resources and facilities.

Turning now to FIG. 2, that figure shows a flowchart of a set of high-level steps that the system (10) could perform to manage user access to resources and facilities. For the sake of clarity, the access server (114) will be discussed as performing the steps, but it should be understood that one or more steps could be performed by other components of the system (10) or a similar system. The access server (114) may display (block 200) available resources to a user via the user device (100) via an interface such as that shown in FIG. 3A. A user's current position (300) is shown, as well as one or more nearby facilities (302) that a user can access. The name and location of the facility (304) may be displayed, as well as the availability or wait times (306) of the facility to aid in a user's selection. In some implementations, the interface of FIG. 3A could show an indicator of the number of people queued at a location by using a number, color, a size-based indicator such as an icon that is scaled to be larger or smaller depending upon the number of people in a queue for that facility, or another symbol, text, or visual identifier.

The access server (114) may receive (block 202) a resource selection from the user and may reserve (block 204) access to the resource for the user in response. Access may be reserved (block 204) in a variety of ways, including by queuing the user in a virtual line of people that have requested access, preventing any other access during a certain future time period reserved for the user, or other similar methods.

The access server (114) may also provide (block 206) a notification to the user when the resource is available for their access. This could occur when the user reaches the front of a virtual queue, upon the occurrence of a reserved period of time, upon arrival at the facility, or other methods. When the user arrives at the facility, the system (10) may provide (block 208) access to the to the facility, via interfaces such as those shown in FIGS. 3B, 3C, and 3D. A check-in button (308) allows a user to indicate that they have arrived at the location. When access is provided (block 208), the access server (114) may display a message (314) via the user device (100) indicating that they should proceed to the facility or resource, and provide any further instructions (e.g., instructions to interact with the access panel 104). Additional controls may be displayed depending upon a particular version and implementation, such as the ability to unlock an open a door (316) via the user device (100).

While some of the techniques discussed herein may require or benefit from a mobile data technology such as 3G, 4G, or 5G wireless data transmission, it should be understood that the technology and processes can also be performed by a user device that is "offline" or that can only access online resources via a Wi-Fi hotspot with some slight modifications. This could be useful for situations where a user is a visitor from another region or country and may not have reliable or usable mobile data capabilities within the area they are visiting. In such a situation, an offline mode may be enabled where the access server (114) will provide a set of offline data to the user device (100) for one or more cities, states, or regions. The set of offline data may be a file or series of files that contain information that will allow the user device (100) to search for and identify facilities without requiring any exchange of data between the access manager (110) and the user device (100) beyond the transmission of the set of offline data.

Depending upon the capabilities of the user device (100), the user experience may be very similar to the normal user experience but may lack real time information from the access manager (110) such as current wait times. For instance, in an "offline" mode, the user device (100) may show the user the locations of associated facilities on a map, but not show real-time information such as the number of other users that are already currently in the queue for each facility on the map. When in "offline" mode, the user device (100) may determine based upon GPS coordinates, if available for that user device (100) without a data connection, or based upon a user input, when the user has arrived at the facility. Upon arrival, the user device (100) may prompt the user to connect to a local facility Wi-Fi connection, which may then allow the user device (100) to access online features.

Other embodiments and features of the system (10) may include those described in U.S. Pat. No. 9,984,520, entitled "Facility and Resource Access System," issued May 29, 2018, the disclosure of which is incorporated herein by reference.

II. Exemplary System for Real-Time Adaptive Facility Deployment

Systems, facilities, and resources such as those described above advantageously provide an improved experience for both users and administrators of such facilities and resources. The advantages of some implementations of such systems are limited by the number of nearby permanent facilities and resources, which can become problematic in situations where a large crowd develops in an area that does not offer sufficient facilities and resources. For example, a weekend music festival in a city might draw several hundred thousand visitors into an area of a square mile or less. Organizers may provide for a number of facilities and resources such as water stations, restrooms, and charging stations in and around the area of the festival, but these temporary arrangements are often inadequate, undesirable, or uncomfortable due to cleanliness, poor conditions, lack of supplies, long lines, heat, or general usability. As a result, many attendees may instead enter private businesses or office lobbies seeking out more permanent, comfortable, and usable restrooms and water fountains, which can lead to unnecessary costs and risks for owners of those areas.

Figure 4:
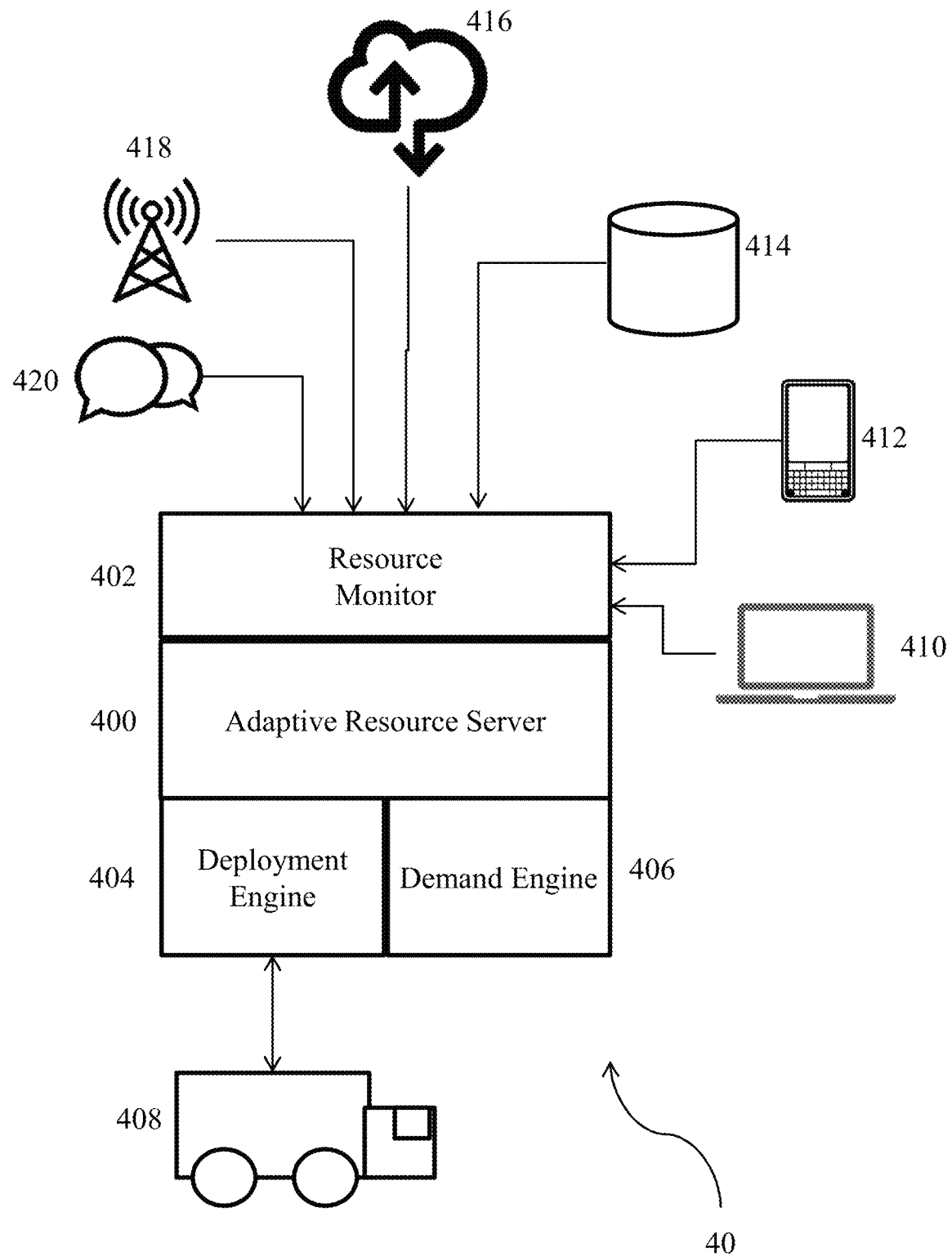
FIG. 4 shows a schematic diagram of an exemplary deployment system for adaptively deploying facilities in real-time.

To address such situations and others, FIG. 4 shows a schematic diagram of an exemplary deployment system (40) for adaptively deploying facilities and resources in real-time. The deployment system (40) may be implemented as an independent system or may be combined or integrated with one or more of the systems, methods, interfaces, and devices disclosed in FIGS. 1-2 above and elsewhere in this disclosure. Facilities and resources deployed by the deployment system (40) may be similar to those described above in the context of FIG. 1, and may in some implementations be located, requested, and accessed by steps similar to those of FIG. 2, as well as by other methods such as those described below.

The deployment system (40) comprises an adaptive resource server (400) configured to provide the features and functions of a resource monitor (402), demand engine (406), and deployment engine (404). The adaptive resource server (400) may be one or more physical or virtual servers, each comprising processors, memory, storage, databases, communication devices, and other devices and features that may be included to provide web services such as those described herein.

The resource monitor (402) is configured to pull and receive information related to resource and facility supply and demand within one or more geographical regions or zones. Such resource information may be received from sources such as social media websites (420) and services, technology infrastructure (418) such as cell towers and internet communication pathways, third-party services (416) such as APIs and other interfaces that provide various types of information (e.g., IoT/Smart City Technology, such as, traffic information, weather conditions or forecasts, crowd conditions or forecasts, density heatmaps, video intelligence), and first-party data (414) that is generated, stored, or otherwise obtained by an administrator of the deployment system (40) (e.g., information on the locations of facilities, resources, use and occupancy time of facilities and resources, and users associated with the access server (414)). The resource monitor (402) may also receive direct requests for deployment of a facility from an organizer (410), which may be an organization, administrator, or staff member involved in organizing or providing an event (e.g., a music festival or sports event), and from a user (412), which may be a current or future attendee of an event that finds themselves in need of a facility or resource, or a visitor to a city that prefers to request a facility or resource rather than searching private businesses and other buildings for accessible facilities and resources. Organizers and users may submit requests using a system such as that described in the context of FIGS. 1-3D, or through an independent system and software, using devices such as smartphones, tablets, laptops and computers, and kiosk devices.

The demand engine (406) may receive the resource information gathered and received by the resource monitor (402) and, over time, identify zones within a geographical area where demand for resources and facilities is likely to exceed or has exceeded a supply of such resources and facilities conveniently accessible from that zone. The demand engine (406) may also receive direct requests from organizers (410) and users (412) that are in need of facilities and resources. In response to this information, the demand engine (406) may prepare and position facilities for future deployment to potential high demand zones, or direct facilities to be deployed in response to direct requests or actual high demand zones.

The deployment engine (404) may be configured to manage the location, distribution, deployment, and status of a plurality of mobile facilities (408). In various implementations this may include, based upon data received from the demand engine (406) and its own inventory of mobile facilities (408), directing one or more mobile facilities (408)

to positions within a geographical area that will place them near zones of potential high demand, deploying one or more mobile facilities (408) to locations based upon actual requests or actual zones of high demand, recalling or returning mobile facilities (408) from deployment or distribution based changing circumstances or reduced demand, and other functions. When used herein, distribution should be understood to refer to positioning the mobile facility (408) so that it is conveniently located and available for future deployment while not necessarily being immobilized or immediately available for access or use, while deployment should be understood to refer to positioning the mobile facility (408) in a location where its use is likely or assured, and configuring the mobile facility (408) so that it accessible and usable (e.g., immobilizing the mobile facility (408), unlocking a door, enabling a feature, placing a stair or step used to access the facility).

The deployment engine (404) may direct the mobile facilities (408) in different ways depending upon a particular implementation. For example, in some implementations the deployment engine (408) may automatically provide instructions, such as textual descriptions or road navigation and turn-by-turn guidance to a driver of a mobile facility (408) based upon information received from the demand engine (406). In some implementations, the deployment engine (408) may provide data and instructions to an autonomous driving system of a mobile facility (408) based upon information received from the demand engine (406). Such instructions are usable by a driver or autonomous driving system to distribute or deploy the mobile facility (408) as needed.

Figure 5:
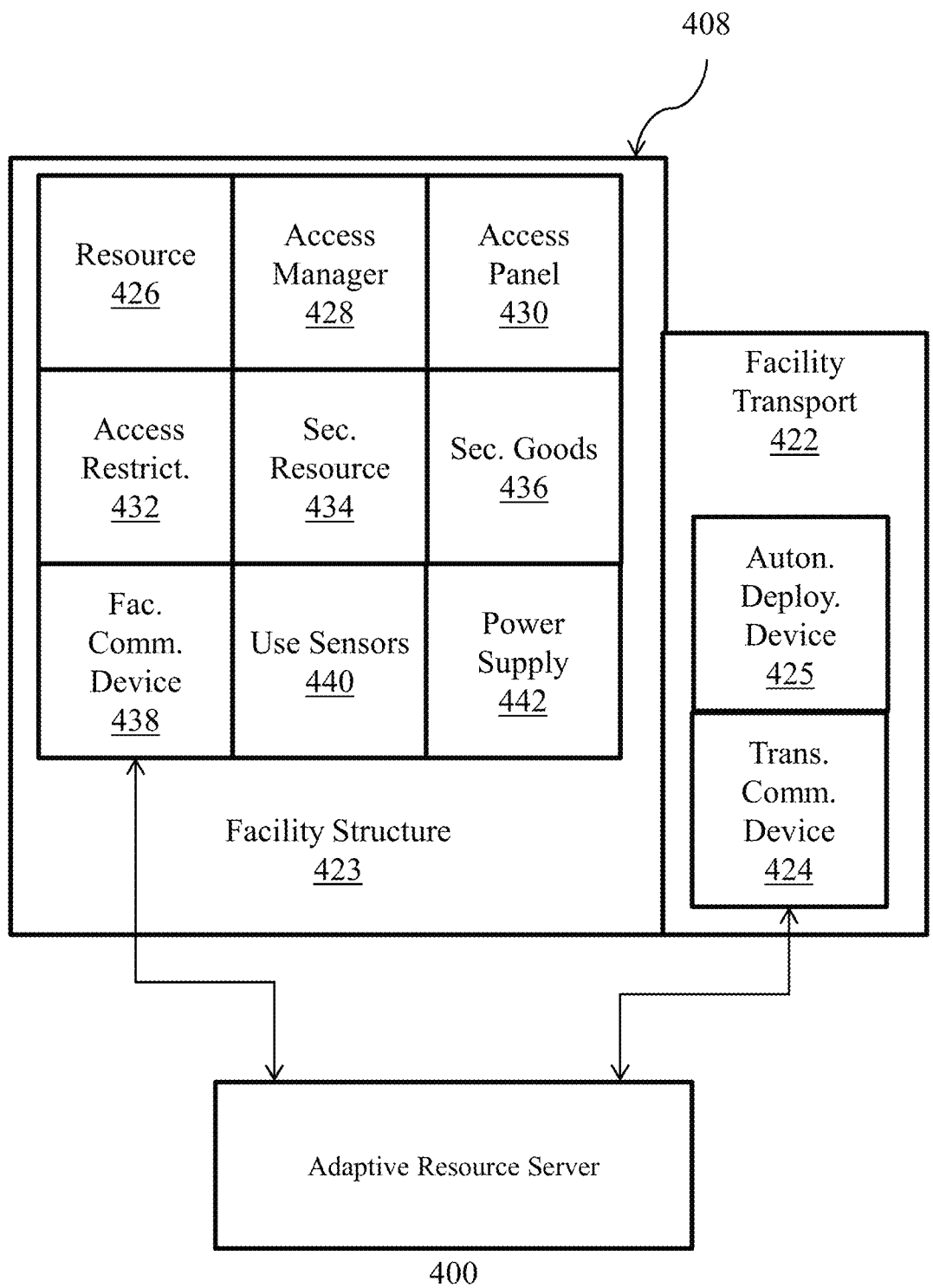
FIG. 5 shows a schematic diagram of an exemplary deployable facility for use with the deployment system.

Turning now to FIG. 5, that figure shows a schematic diagram of an exemplary mobile facility such as the mobile facility (408). A facility transport (422) may be a vehicle capable of transporting the facility to various locations, and may include, for example, trucks, vans, boats, rail cars, and other vehicles, depending upon the nature of the facility being transported. For example, in some embodiments where the facility is relatively small (e.g., a stand or kiosk with a wireless hotspot and several phone charging stations), the facility transport (422) may even be, for example, a motorcycle, bicycle, scooter, cart, or even a wearable or carriable transportation device such as a backpack in the case of lightweight facilities. The facility transport (422) may also be a robotic delivery system, which may be, for example, a fully automated and autonomous cart or other vehicle that is capable of carrying, pushing, pulling, or otherwise maneuvering the facility to a destination.

The facility transport (422) comprises a deployment device (425), which may be a smartphone, tablet, computer, navigation system, or other proprietary device usable by a driver to receive and respond to distribution and deployment instructions. In some implementations, the deployment device (425) may additionally or alternatively comprise an autonomous driving system configured to receive distribution and deployment instructions, and automatically pilot the facility transport (422) in response. A transport communication device (424) may be a wireless communication device such as a cellular network modem, Wi-Fi modem, or other similar communication device capable of receiving instructions and information from systems such as the adaptive resource server (400), deployment engine (404), access server (114), and other systems. In some implementations, the transport communication device (424) and the deployment device (425) may be the same device (e.g., a smartphone).

The facility transport (422) is capable of transporting the facility structure (423), which in various implementations may be the separate or same structure as the facility transport (422), and may be manually driven, or fully or semi-autonomously driven. For example, in some implementations the facility structure (423) may be a cargo area permanently attached to a truck or van and configured to allow users to access the interior to use one or more resources (426) contained therein (e.g., restrooms, water fountains). In some implementations, such a cargo area may be only temporarily carried by the facility transport (422), such that the facility structure (423) could be deployed at a position and the facility transport (422) may be assigned to other distribution and deployment tasks. In some implementations, the facility structure may have an interior comprising one or more resources (426) usable from the interior, an exterior comprising one or more resources (426) usable from the exterior, or both.

Some examples may include a cargo truck (e.g., the facility transport (422)) having one or more restrooms built within a cargo area (e.g., the facility structure (423)), vending devices usable to purchase water, mobile device power banks, or other goods positioned on the exterior, and a Wi-Fi hotspot configured to provide connectivity in a limited radius around the truck. Such a truck could, upon deployment to a high demand zone, provide restrooms, beverages, connectivity, and power to potential users at that location.

Other examples may include a cargo area such as described above built into a hitch-hauled trailer or other conveyance and transportable by any vehicle with a matching hitch. Still other examples may include a kiosk unit offering limited vending, power charging, and wireless connectivity, with no interior resources, which may be transportable by a bike, cart, or other transport device without reliance upon roadways. Other examples and variations on the type and structure of the facility transport (422) and the facility structure (423) will be apparent to one of ordinary skill in the art in light of this disclosure.

As has been described above, a facility structure such as the facility structure (423) can have a variety of features. The facility structure (423) of FIG. 5, for example, comprises an access manager (428), access panel (430), and access restrictor (432). The function of these components varies, but can generally be understood to be respectively similar to the access manager (110), the access panel (104), and the facility door (106) and its related components (e.g., the automatic opener (101), the automatic locking mechanism (102), the facility devices (116), and the motion detector (108). The access panel (430) may be interacted with by a user (e.g., with a smartphone, QR code, or other identifying device) to cause the access manager (428) remove or disable the access restrictors (432) and gain access to and use of one or more resources (426).

The access manager (428) may communicate with the access server (114), adaptive resources server (400), facility transport (422), or other system or device via a facility communication device (438), which may be the same or a different device than the transport communication device (424). The access manager (428) may also control the availability of, configuration of, or operation of resources and features of the facility structure (423) based upon whether the mobile facility (408) is currently deployed or distributed. As such, the access manager (428) may be implemented as a server, computer, smartphone, or other device within the facility structure (423) having data processing and communication capabilities as described above. Access to facilities and resources may be managed in various ways, and may include implementations that are on-demand (e.g., if the resources is free and a request is made access is granted), queued (e.g., upon an access request a user is placed in a queued list of waiting users), or contextual (e.g., access is granted to requesters based upon their proximity, need, user status, software configurations, or otherwise with a goal of providing efficient access to all users). Other methods of providing a user a valid access credential and subsequent access may be performed in various ways beyond those described above, with such variations being apparent to one of ordinary skill in the art in light of the disclosure herein.

The access restrictor (432) may be one or more physical or technological barriers to accessing or using the resources (426), and may include a door such as the facility door (106), an automated window cover that opens up to reveal charging stations or internet connections, a configuration change that enables or disables a Wi-Fi hotspot, or other similar controls.

The facility structure (423) shown also comprises secondary resources (434), which may be resources that are secondary to a primary resource for which the mobile facility (408) is deployed. This could include, for example, where the mobile facility (408) is deployed by the deployment engine (404) based upon high demand for restroom. In this example, the resource (426) would be one or more restrooms, while the secondary resource (434) might be charging stations or Wi-Fi hotspots. Similarly, the mobile facility (408) may offer one or more secondary goods (436) that may be purchased when deployed, such as beverages, snacks, power banks, disposable cameras, or other similar goods. The secondary goods (436) may be manually transacted by the driver of the mobile facility (408), for example, or may be transacted through interactions with an automated vending machine or similar device, or both.

The mobile facility (408) also comprises one or more use sensors (440) configured to detect use of the resources (426), the secondary resources (434), and the secondary goods (436). This could include a sensor such as the motion sensor (108) to detect and determine whether a restroom is in use or locked from within, the status of tissue paper, soap and other supplies, fill levels of water storage tanks or waste storage tanks, traffic on a Wi-Fi hotspot, electrical draw on a set of phone chargers, goods dispensed from a vending machine, and other information. Such information may be usable by the deployment engine (404) to determine when the mobile facility (408) should be recalled from deployment, serviced, or restocked. The mobile facility (408) also comprises a power supply (442), which may include one or more of a connection to the facility transport (422) to receive power produced by an alternator, solar panels positioned on the facility structure (423), batteries, or other power sources.

The mobile facility (408) of FIG. 5 is exemplary, and it should be understood based upon the above that many of the described components are optional (e.g., some mobile facilities may not have the access panel (430) or the access restrictors (432)). Such variations and others will be apparent to one of ordinary skill in the art in light of the disclosure herein.

III. Exemplary Method for Real-Time Adaptive Facility Deployment

Figure 6:
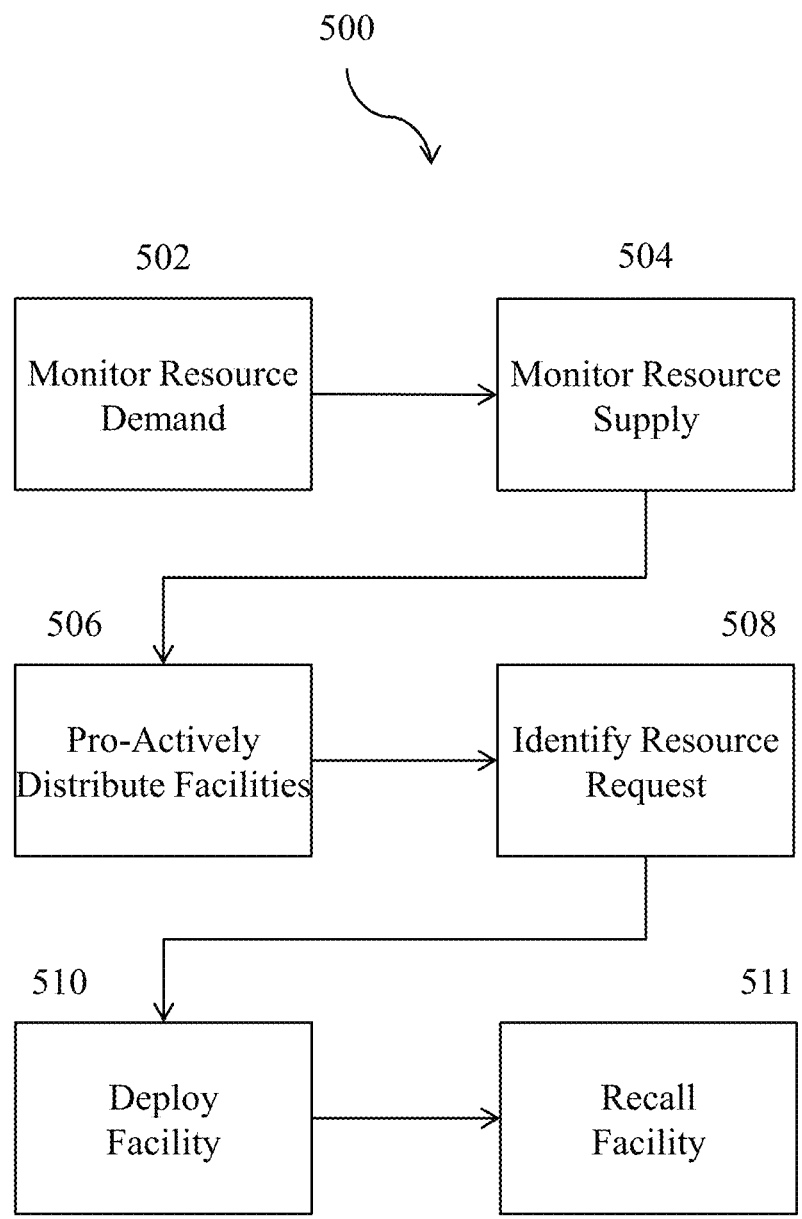
FIG. 6 shows a flowchart of an exemplary set of high-level steps that the deployment system may perform to distribute and deploy facilities.

Having describes the deployment system (40) above, FIGS. 6-13 show methods that may be performed by or with one or more components of the deployment system (40) or the system (10). Turning now to FIG. 6, that figure shows an exemplary set of high-level steps (block 500) that the deployment system (40) may perform to distribute and deploy facilities. These steps comprise monitoring (block 502) for resource demand (e.g., the resource monitor (402) receiving information from one or more sources associated with resource demand), monitoring (block 504) for resource supply (e.g., the resource monitor (402) receiving information from one or more sources associated with current or pre-existing resource supply), pro-actively distributing (block 506) facilities to anticipate high demand zones, identifying (block 508) resource requests (e.g., direct requests from users (412) or organizers (410), or detection of a high demand zone), deploying (block 510) one or more facilities from a distribution point to a deployment point where they are accessible and usable to nearby users, and recalling (block 511) one or more facilities when they are no longer needed.

Figure 7:
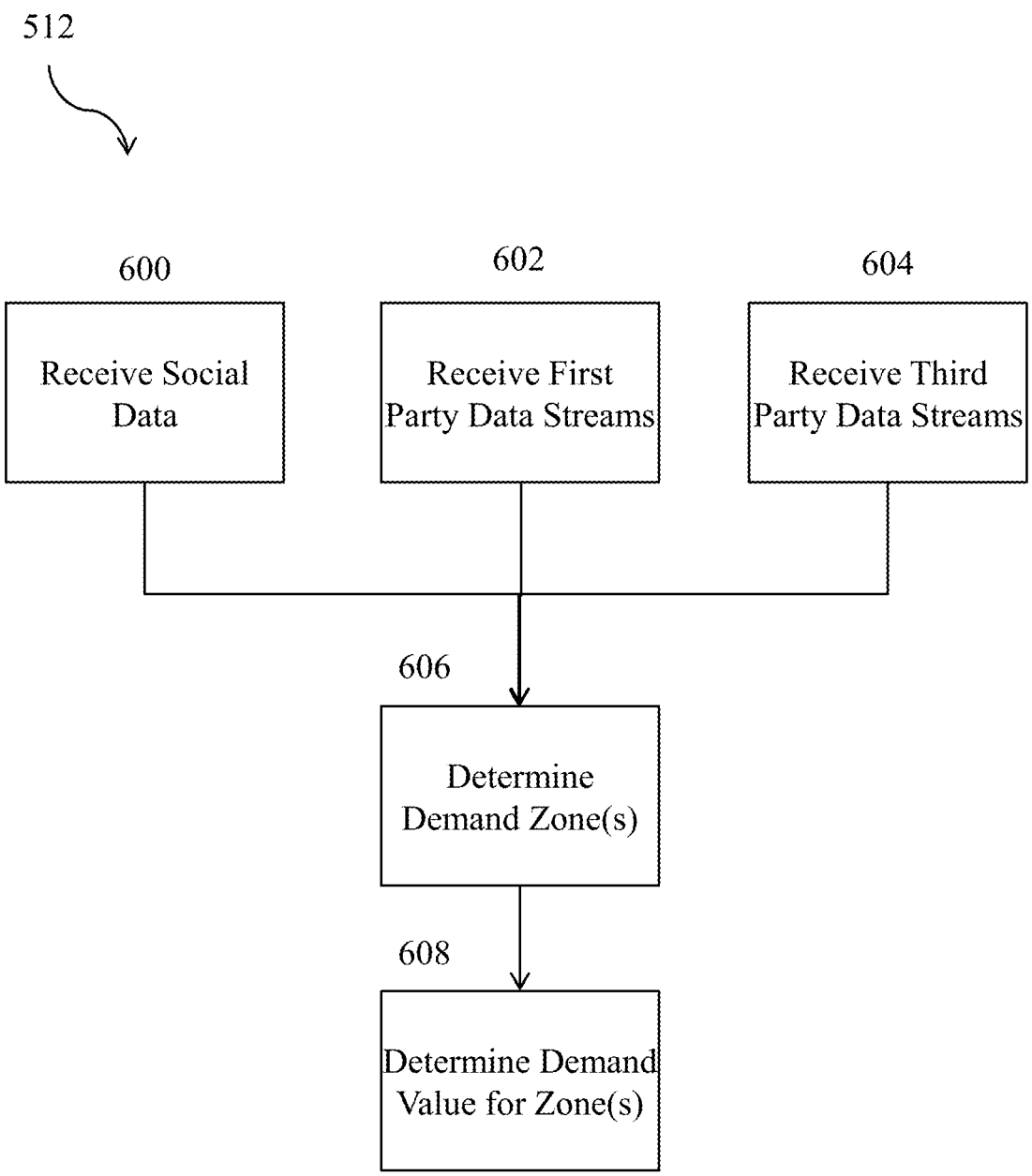
FIG. 7 shows a flowchart of an exemplary set of steps that the deployment system may perform to monitor demand for resources.

FIG. 7 shows an exemplary set of steps (block 512) that the deployment system (40) may perform to monitor (block 502) demand for resources. The resource monitor may receive (block 600) social data from one or more social media sites (420), platforms, or services. This could include both publicly available data, such as broadcast messages, hashtags, and trending topics, as well as private data, such as direct messages to accounts or pages maintained in relation to the deployment system (40), or accounts or pages maintained in relation to an organizer (410) or user (412) and provided to the resource monitor (402) by that party. Such information may be scraped or crawled by the resource monitor (402) or may be pulled using an API or other interface as may be provided for particular platforms. Social media information may be a useful indicator of potential or actual high demand for resources, as events that draw large crowds are often paired with hashtags, photo and status updates, and location information. For example, a steady increase in the number and frequency of hashtags associated with a music festival can be indicative of a growing crowd, as well as a growing need for access to facilities and resources at the music festival.

The resource monitor may also receive (block 602) information from one or more first-party data streams. The first-party data streams may be databases, systems, sensors, APIs, or other applications maintained by the party providing the deployment system (40). For example, the access system (114) may be a first-party data stream, as it can provide information related to volume of use of one or more facilities within a geographic area or user searches for facilities within an area. As another example, the deployment system (40) may have one or more remote sensors or systems usable to provide information relating to resource demand. This could include imaging devices or crowd counting devices installed on the mobile facility (408) or carried by drones, sensors installed at entryways to an event venue, or other sensor configurations. Such data may also include information for occupancy time, usage time, and other available information indicating the capacity for use and actual use of facilities and resources in areas surrounding the zone.

The resource monitor may also receive (block 604) information from one or more third-party data streams. Third-party data streams may be databases or datasets maintained by third parties and accessible by APIs or other interface to retrieve relevant information. Third-party data streams may include information from a traffic software provider indicating high traffic towards certain areas of a city or other geographical area, information from a bike or scooter rental platform indicating high rental traffic towards certain areas of a city, information from an electrical or water utility provider indicating increased use of water and electric, information from a ticket sales platform indicating the location and occurrence of an event and a number of attendees, information from a ride sharing provider indicating an increased number of passengers being dropped off in an area, and other similar information, IoT/Smart City Technology, density heatmaps, and video intelligence. Third-party data streams may also include information from technology infrastructure (418) such as cellular data traffic.

Such data received by the resource monitor (402) may be used by the demand engine (406) to determine (block 606) one or more demand zones within a geographical area serviced by the deployment system (40). A demand zone may be an area within a geographical area with a defined border and having various shapes and sizes. Demand zones may be determined (block 606) based upon manual configuration, such as where a city contains a large park that is frequently crowded. The demand engine (406) could be configured to give preference to the manually configured boundary of the park when determining (block 606) the shape and boundaries of demand zones within the city. Demand zones may also be determined (block 606) automatically, based upon information received by the resource monitor (402). For example, where a number of social media users are all posting photos associated with location information for a several block area within a city, a demand zone may be automatically created with a shape based upon the discrete locations of images, the volume of activity, street boundaries, or other factors. As another example, where third-party data indicates the occurrence of a sporting event at a sports venue, a demand zone may be automatically created with a size and shape encompassing the venue, as well as any parking locations and restaurants within one kilometer.

After one or more demand zones have been determined (block 606), the demand engine (406) may then determine (block 608) a demand value for each zone.

The demand value may be an abstracted numeric representation of information received by the resource monitor (402) that is associated with the zone. The demand value may be determined by assigning weights to and aggregating received information that is associated with a zone in order to produce a numeric value representative of the overall demand for resources within that zone. For example, each use of a hashtag associated with a zone may be weighted at 1, while general social media posts containing keywords that are relevant to demand (e.g., "bathroom", "crowded", "lines") may be weighted at 10. First-party data streams, such as searches and uses of permanent facilities from the access server (114) may be weighted highly due to their verifiable accuracy. Third-party data streams may be weighted differently based upon their relevance. For example, traffic data may indicate people driving towards an event, but could also indicate vehicles driving to an event to pick up attendees and drive them home. Conversely, cellular data traffic from technology infrastructure (418) may be weighted more heavily, as it can be accurately tracked over time as a crowd forms and then disperses.

Figure 8:
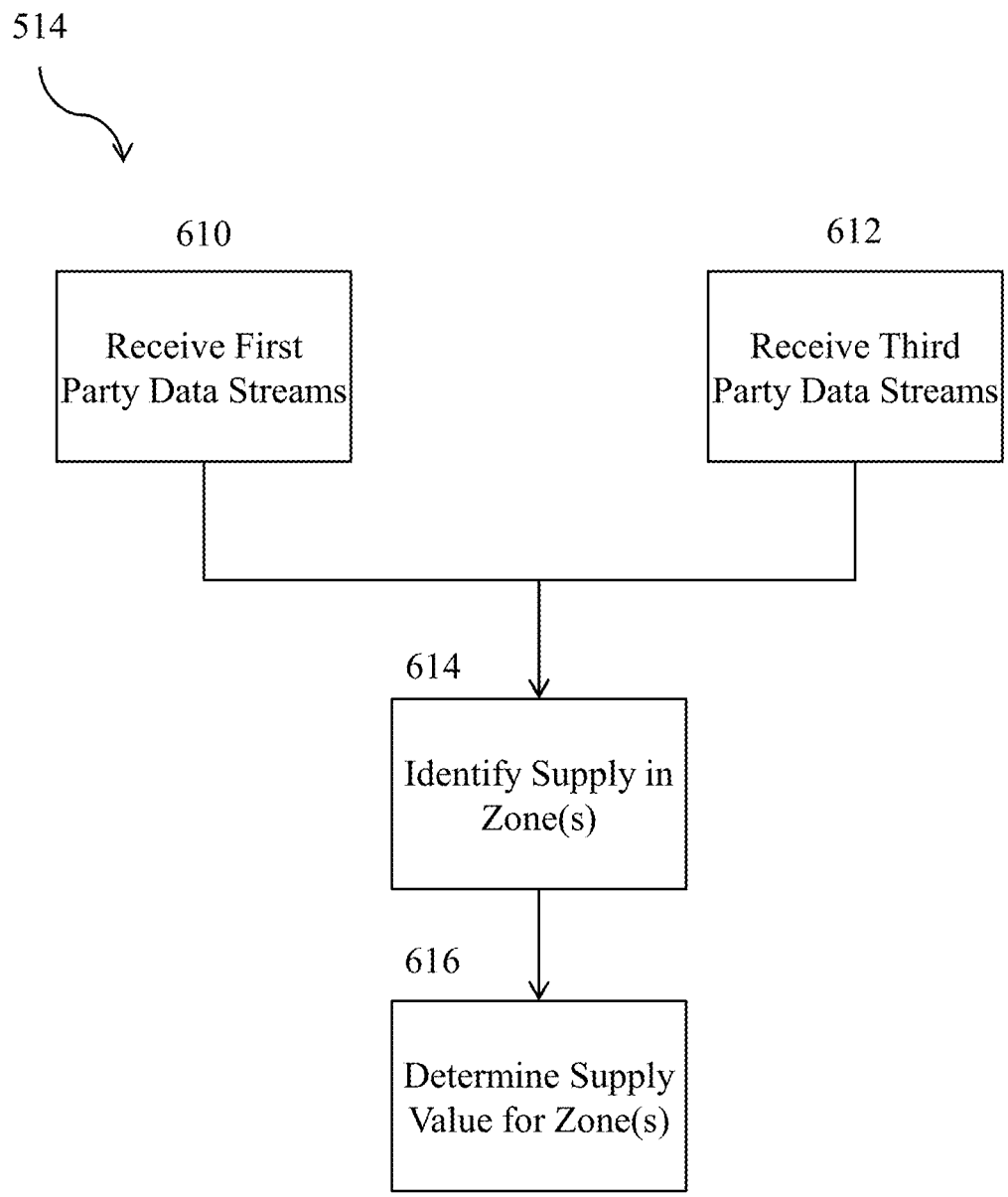
FIG. 8 shows a flowchart of an exemplary set of steps that the deployment system may perform to monitor supply of resources.

Turning now to FIG. 8, that figure shows an exemplary set of steps (block 514) that the deployment system (40) may perform to monitor (block 504) supply of resources. While monitoring (block 502) resource demand, the resource monitor (402) may also receive (block 610) first-party data streams and receive (block 612) third-party data streams containing information associated with current or pre-existing supplies and availability of resources within a geographical area or demand zone. Such first-party data could include information from the access server (114) indicating a number of permanent facilities already available in that area (e.g., restrooms or other resources located in coffee shops or other buildings and configured for access and use with the system (10)), information from one or more mobile facilities (408) indicating their location, deployment status, and availability, and other information.

Such information could also include information manually configured by an administrator of the deployment system (40) (e.g., manually entered information indicating the presence and location of public or temporary restrooms and resources, the presence and location of private businesses having resources accessible without the access server (114)). Received (block 612) third-party data streams may include information from mapping and navigation platforms, business review platforms, and other platforms that indicate the presence and location of businesses having private restroom or resources, or public restroom or resources within a city or other geographical area.

The demand engine (406) may then identify (block 614) from the received information the types, locations, and quantities of resources available within the one or more determined (block 606) demand zones and determine (block 616) a supply value for each demand zone. As with the demand value, the supply value may be an abstracted numeric representation of information received by the resource monitor (402) that is associated with the zone. The supply value may be determined by assigning weights to and aggregating received information that is associated with a zone in order to produce a numeric value representative of the overall availability and accessibility of resources within that zone. The particular abstraction and representation implemented for the supply value and the demand value should be related so that the two values can be meaningfully compared to each other.

For example, if the demand value is a number between one and one hundred, the supply value could also be a number between one and one hundred, and the demand value exceeding the supply value could indicate a need for additional resources. As another example, if the demand value is a number of any size representing a number of persons within a demand zone that might need a resource within a ten-minute time frame, then the supply value may be a total number of resources in that demand zone. Supply values may also be determined or influenced based upon accessibility of resources (e.g., where available resources are concentrated into a small area of a large demand zone) or quality of resources (e.g., where available resources are of a temporary nature such as portable restrooms or portable water stations). Various possible implementations exist for a demand value and a supply value allowing for meaningful comparisons, and such variations will be apparent to one of ordinary skill in the art in light of this disclosure.

Figure 9:
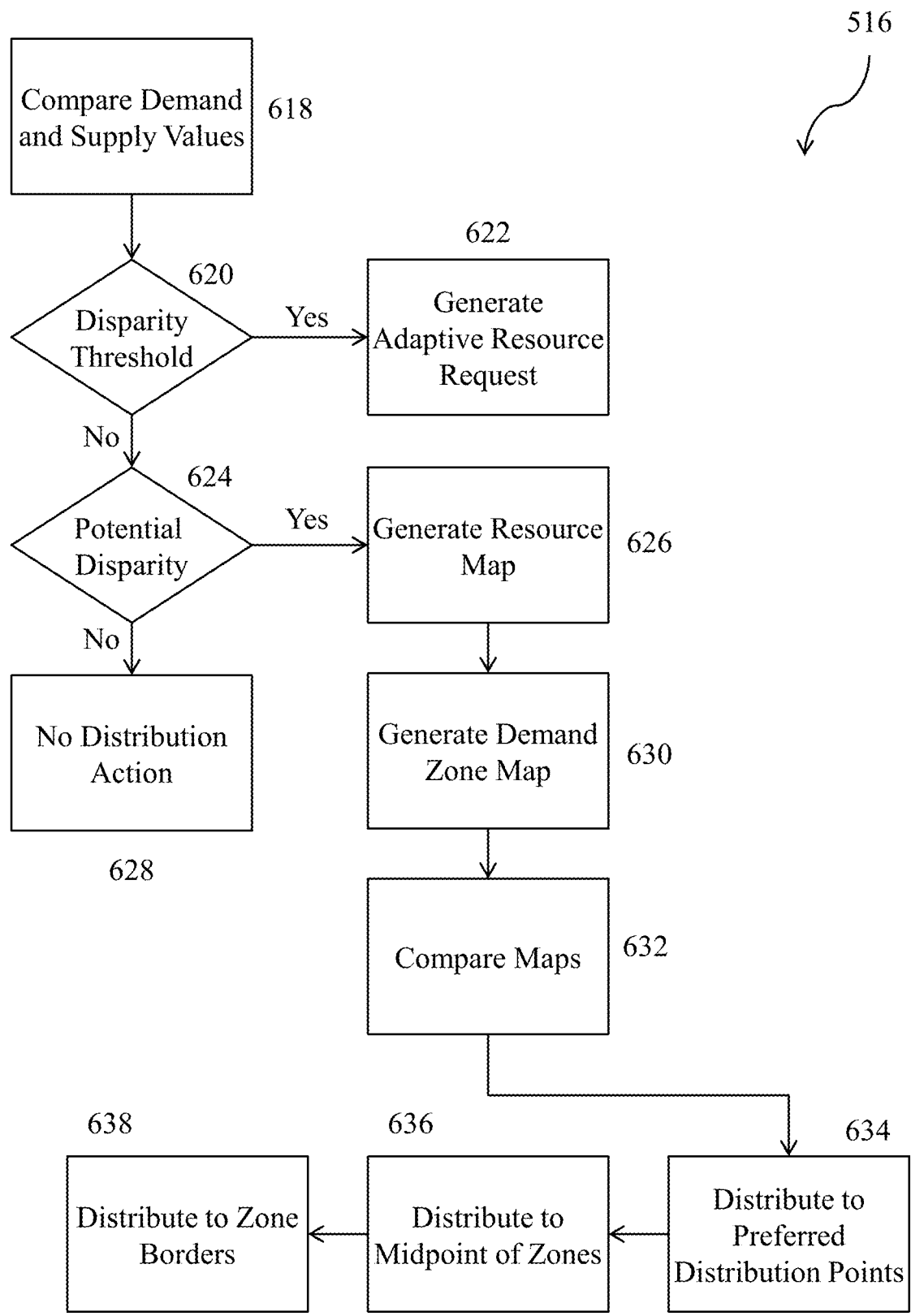
FIG. 9 shows a flowchart of an exemplary set of steps that the deployment system may perform to distribute facilities prior to deployment.

FIG. 9 shows an exemplary set of steps (block 516) that the deployment system (40) may perform to distribute (block 506) facilities prior to deployment. Based upon information from the demand engine (406), the deployment engine (404) may direct one or more mobile facilities (408) in operation with a geographical zone to be distributed across that geographical zone to positions that may provide them more timely and convenient access to developing demand zones. In this manner, the time required to deploy the mobile facility (408) when a developing demand zone becomes a high demand zone may be reduced. For example, if each mobile facility was stored at a handful of centralized transit stations until needed, there would be a time cost in moving the mobile facility to a roadway and proceeding to a deployment position that may be arbitrarily located relative to the centralized transit station. A plurality of roaming mobile facilities (408) that have been distributed across a geographical area in anticipation of developing high demand zones may in many or most cases be deployed with a much shorter time cost.

To provide this functionality, the demand engine (406) may compare (block 618) the demand value and the supply value for multiple demand zones within its geographical area. This may occur in parallel and in real-time as demand zones are created and updated (e.g., changes in size or shape), and as demand values and supply values change and are updated (e.g., a concert or sports event ending may increase the demand value, while the deployment of one or more mobile facilities may impact the supply value).

When the demand engine (406) determines that a disparity threshold has been exceeded (block 620) for a demand zone, the demand engine (406) may automatically generate (block 622) and provide an adaptive resource request to the deployment engine (404) that will cause one or more mobile facilities (408) to be deployed to that demand zone. For example, where the supply value and the demand value are numbers between one and one hundred, the disparity threshold may be exceeded (block 620) when the demand value exceeds the supply value by five or more.

When the disparity threshold is not exceeded (block 620), but the demand engine (406) determines (block 624) that there is a potential disparity in one or more demand zones, the demand engine (406) may provide distribution instructions to the deployment engine (404) that will cause one or more mobile facilities (408) to be distributed to locations that are convenient for accessing one or more of the potential high demand zones (e.g., demand zones that are showing an increase in demand, but that have not yet exceeded (block 620) the disparity threshold).

When potential disparities are determined and identified (block 624), the demand engine (406) may generate (block 622) a resource map showing the locations of known resources (e.g., permanent resources, deployed mobile facilities, and other previously identified (block 614) resources) within a geographical area in which the potential demand zones are located. The demand engine (406) may also generate (block 630) a demand zone map showing the locations, sizes, shapes, and characteristics (e.g., magnitude, speed of growth, etc.) of the potential high demand zones. The demand engine (406) may then compare (block 632) the resource map to the demand zone map and determine one or more distribution points for mobile facilities. Distribution points may be static locations (e.g., a location where the mobile facility (408) parks and waits for further instructions) or dynamic locations or routes (e.g., a circular route that the mobile facility (408) follows while awaiting further instructions). A variety of rules or procedures may be applied during the comparison (block 632) with parallel goals such as maximizing coverage of a geographical area, maximizing coverage of potential high demand zones, minimizing distance of travel to quickly growing demand zones, and avoiding traffic accidents and road congestion.

For example, one distribution goal may be to distribute (block 634) one or more mobile facilities to pre-configured preferred distribution points that are within or proximate to one or more potential high demand zones. Preferred distribution points may be locations within a city or other geographical area that have been identified as ideal for quick and efficient access to other parts of the geographical area. For example, an interstate roadway that circles a metropolitan area and that offers multiple points of exit into the metropolitan area may be a preferred distribution point for demand zones within. Another preferred distribution point may be a parking lot with exits to several surrounding roadways that are generally not congested with pedestrian or vehicle traffic. Another preferred distribution point may be a street or reserved sparking spot within a downtown area that is within a few blocks of several music and sports venues.

Another distribution goal, which may be prioritized lower than distributing (block 634) to preferred distribution points, may be to identify one or more demand zones whose borders are close to, or actually touch or overlap, and to distribute (block 636) mobile facilities to midpoints between those demand zones. For example, if two demand zones are developing within a downtown area, the demand engine (406) may identify a central point of each demand zone based upon its size and shape, then identify a midpoint between the two central points as a distribution point. This midpoint may fall within one of the demand zones depending upon their characteristics but will have a likelihood of being a convenient point to deploy to either of the two demand zones if the need arises. Distribution (block 636) to midpoints could similarly occur for three or more nearby demand zones, and in the absence of preferred distribution points may on average minimize the time to deploy to any of the associated demand zones.

Another distribution goal, which may be prioritized lower than distributing (block 636) to midpoints, may be to distribute (block 638) to borders of a demand zone. A distribution point at or traversing along the border of a potential high demand zone may position a mobile facility so that it can efficiently enter and deploy within the demand zone, while also allowing it to be distributed or deployed to a different demand zone without being caught in traffic or congestion related to the bordered demand zone. This may be especially effective when there are multiple demand zones having borders that are near, but not overlapping, such that a mobile facility could be distributed to an area where it has quick access to several demand zones without being caught within the congestion related to a single demand zone.

Other distribution strategies exist and will be apparent to one of ordinary skill in the art in light of this disclosure. For example, mobile facilities could be distributed to central points within each potential high demand zone as they form, could be evenly distributed across a metropolitan area without particular regard to demand zones, could be distributed to locations that allow them to refuel, resupply, clean, or otherwise maintain the mobile facilities while they await deployment, and other similar strategies.

Figure 10:
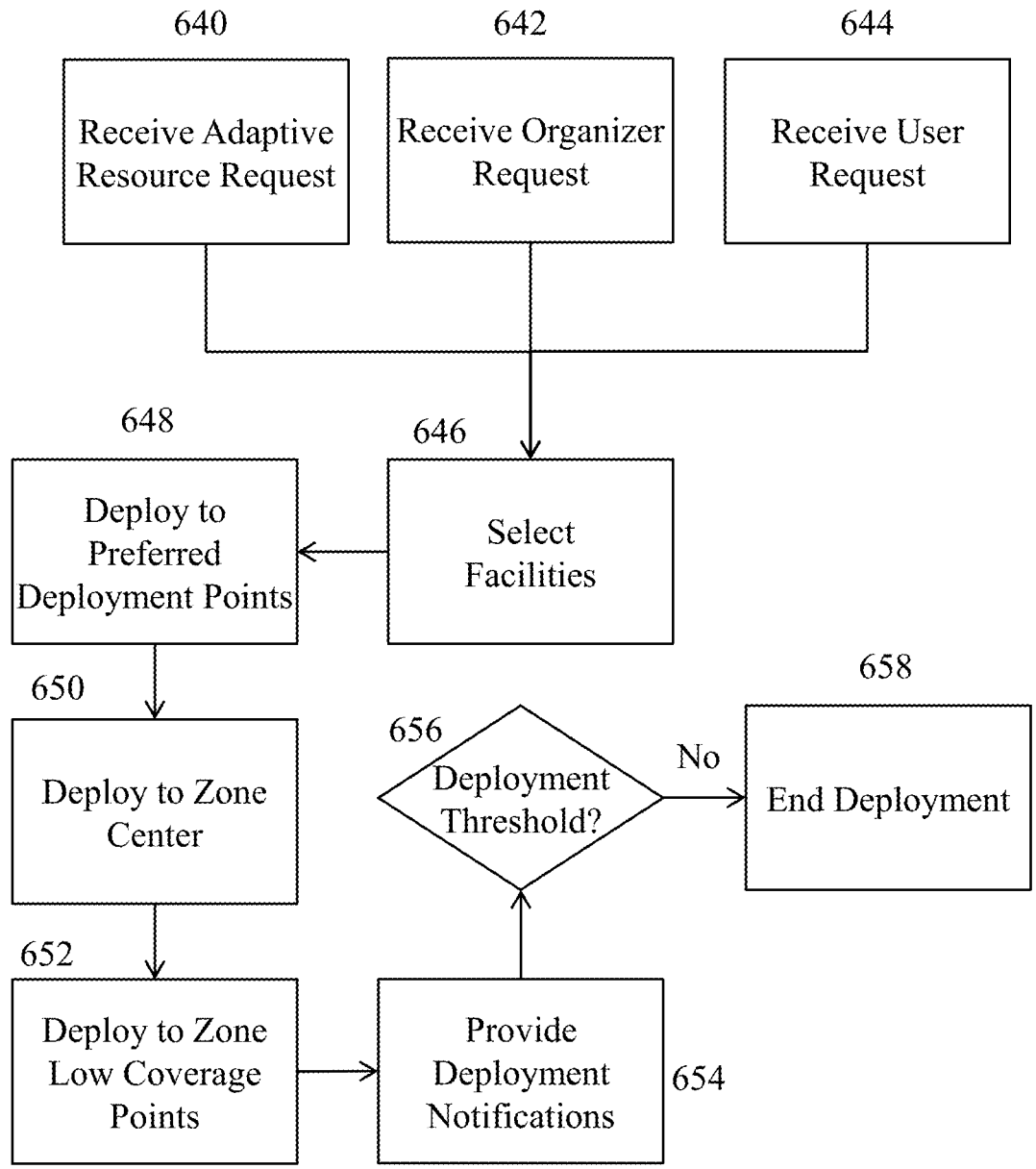
FIG. 10 shows a flowchart of an exemplary set of steps that the deployment system may perform to deploy facilities.

Turning now to FIG. 10, that figure shows an exemplary set of steps (block 518) that the deployment system (40) may perform to identify (block 508), deploy (block 510), and recall (block 511) mobile facilities. The deployment engine (404) may receive a request instructions indicating a deployment is necessary, and in response may provide instructions (e.g., navigational directions or autonomous driving instructions to a driver or autonomous deployment device (425) of the facility transport (422)) directing one or more mobile facilities based upon the request.

Requests may be received (block 640) as adaptive resources requests that are automatically generated (block 622) by the demand engine (406) as described above. An adaptive resource request may contain information such as a magnitude of demand disparity and a demand zone location and characteristics. Requests may also be received (block 642) from a person such as the organizer (410). An organizer request may contain information such as a number of mobile facilities desired, deployment locations for mobile facilities, dates and times of deployment, and special instructions or authorization credentials that may be required to deploy at the deployment locations (e.g., where a deployment location is within a private parking lot, the organizer request may contain a key, code, image, or other authenticators usable to access the private parking lot).

Requests may also be received (block 644) from a person such as the user (412). A user request may contain information such as the user's present location (e.g., either manually chosen or automatically determined by a user device such as the user device (100)), a duration of time in which they would like the mobile facility to arrive, a description or photograph of a location nearby the user at which the mobile facility could deploy, an image of the requesting user, an indication of whether there are other potential users of the mobile facility (408) with or proximate to the requesting user, and other information.

As requests are received, the deployment engine (404) may select (block 646) one or more distributed mobile facilities based upon their proximity or ease of access to the deployment location and cause the selected (block 646) mobile facilities to deploy to those locations. Where a deployment point is not specifically defined in the request, such as where the request is an adaptive resource request, or a user or organizer request that doesn't specify particular locations, the deployment engine (404) may automatically select deployment points based upon one or more distribution goals intended to maximize the accessibility of the mobile facility.

For example, one deployment goal treated with a high priority may be to deploy (block 648) to manually configured preferred deployment points that are within a high demand zone, or proximate to a user or organizer request location. Preferred deployment points may be chosen based upon accessibility from preferred distribution points, distance from major roadways or interstates, visibility and position relative to nearby structures such as sports venues, availability of connections to electric supplies, water supplies, sanitation infrastructure, or other utilities, and other considerations.

Another deployment goal when responding to adaptive resource requests may be to deploy (block 650) to as close to the zone center as possible. This may be advantageous to provide maximum average accessibility to anyone within the high demand zone. Another deployment goal may be to deploy (block 652) to a point in the high demand zone where resource supply has been identified (block 614) as having low coverage. For example, if a demand zone already contains a number of permanent facilities and resources (e.g., in coffee shops or restaurants), or one or more other mobile facilities have already been deployed, the deployment engine (404) may deploy (block 652) to an area within the demand zone that is furthest from the pre-existing facilities and resources, to improve ease of access to users in that remote part of the zone. As with distribution, other strategies and goals for deployment exist, and will be apparent to one of ordinary skill in the art in light of this disclosure.

When a mobile facility deploys, the deployment engine (404) or another feature or device may provide (block 654) deployment notifications to one or more recipients. Deployment notifications could be provided (block 654) to requesters such as the user (412) or the organizer (410) and could also be provided (block 654) publicly to others that may be located nearby the recently deployed facility. For example, this could include the resource monitor (402) automatically providing information to social media sites (420) indicating that a mobile facility was deployed at a location and describing resources it offers. Such information could be associated with a trending topic, hashtag, event page, live story, or other similar categorical structure to publicly indicate its availability. The resource monitor (402) may also provide notifications to one or more third-party data streams (416), which could include using APIs or other interfaces to provide a deployment notification which may then appear on a third-party platforms displayable map as an icon or other indicator. Notifications may also be provided via first-party platforms, such as via the user device (100) of the system (10).

Once deployed, the mobile facility (408) will be accessible and usable in different ways depending upon a particular type of user. For example, some users may have a subscription or other pre-purchased access for the resources (426) of the mobile facility (408), as described in the context of FIG. 1. Other users may purchase digital or physical access to the resources (426) at the mobile facility (408) itself prior to use. This could include, for example, using a kiosk or other device to purchase access to the resources (426), and receiving a printed code, optical identifier, digital passcode, or other authentication device that may be provided to the access panel (430) to access and use the resource (426). Persons such as the user (412) and the organizer (410) may pay an initial fee when the mobile facility is requested.

When a particular deployed mobile facility becomes unnecessary, such as where the demand disparity for resources within the demand zone in which it is deployed has decreased, where one or more use sensors (440) indicate that utilization has slowed or stopped, or where the user (412) or the organizer (410) indicates that it is no longer needed, the deployment engine (404) may determine that need for that mobile facility has fallen below a deployment threshold (block 656), and may provide instructions or directions to end (block 658) deployment and return the mobile facility to a distribution point, or a service point where it can be cleaned, resupplied, and otherwise maintained for future distribution and deployment.

Variations on the above disclosed systems and methods exist and will be apparent to one of ordinary skill in the art in light of this disclosure. Other feature and systems, such as the system (10), may also be implemented with the deployment system (40), several of which are described below.

IV. Exemplary Method for Cost Sharing of Facility Deployment

Figure 11:
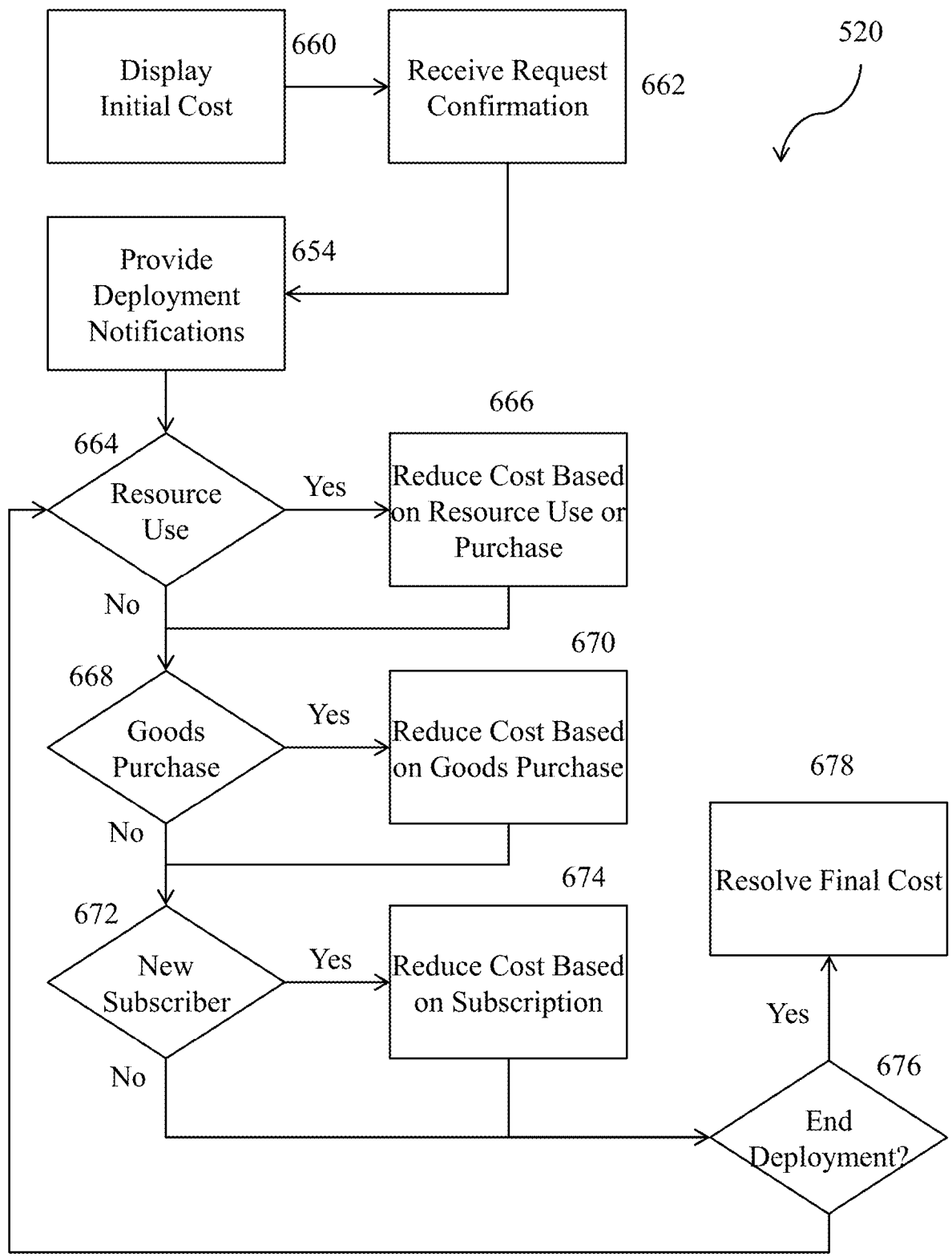
FIG. 11 shows a flowchart of an exemplary set of steps that the deployment system may perform to share costs associated with facility deployment.

Turning now to FIG. 11, that figure shows an exemplary set of steps (block 520) that the deployment system (40) may perform to share costs associated with deployment of the mobile facility (408). This may be particularly applicable to users such as the user (412) and the organizer (410), who may pay a fee or cost associated with the request of the mobile facility (408). When a request is received, the deployment system (40) may display (block 660) an initial cost of deployment to the requester and receive (block 662) confirmation of the cost and request in response.

After deployment of the mobile facility (408) as requested, the deployment system (40) may provide (block 654) deployment notifications to other potential users as has been described, and then track usage and interactions with the mobile facility (408) during that deployment in order provide certain benefits to the requesting user based thereon. For example, where a user other than the requesting user purchases (block 664) access to and use of the resources (426) or the secondary resources (434), the deployment system (40) may track such purchases and reduce (block 666) the cost of the deployment to the requesting user to an amount less than the displayed (block 660) initial cost. Similarly, where purchases of the secondary goods (436) occur during that deployment, the cost to the requesting user may be reduced (block 670) based upon the type and quantity goods purchased.

In implementations where access to the mobile facility (408) and the resources (426) is purchased based upon a subscription or prior purchase of a number of uses, the deployment system (40) may also identify one or more new subscribers (block 672) or purchasers of such a service, and may reduce (block 674) the cost of the deployment to the requesting user based thereon.

When the mobile facility (408) deployment ends (block 676), whether as a result of declining usage or direct user request, the deployment system (40) may resolve (block 678) a final cost of the deployment based upon the displayed (block 660) initial cost and any reductions (block 666, block 670, block 674) and then complete the transaction with the requesting user.

V. Exemplary Method for Facility Use Based Benefits

Figure 12:
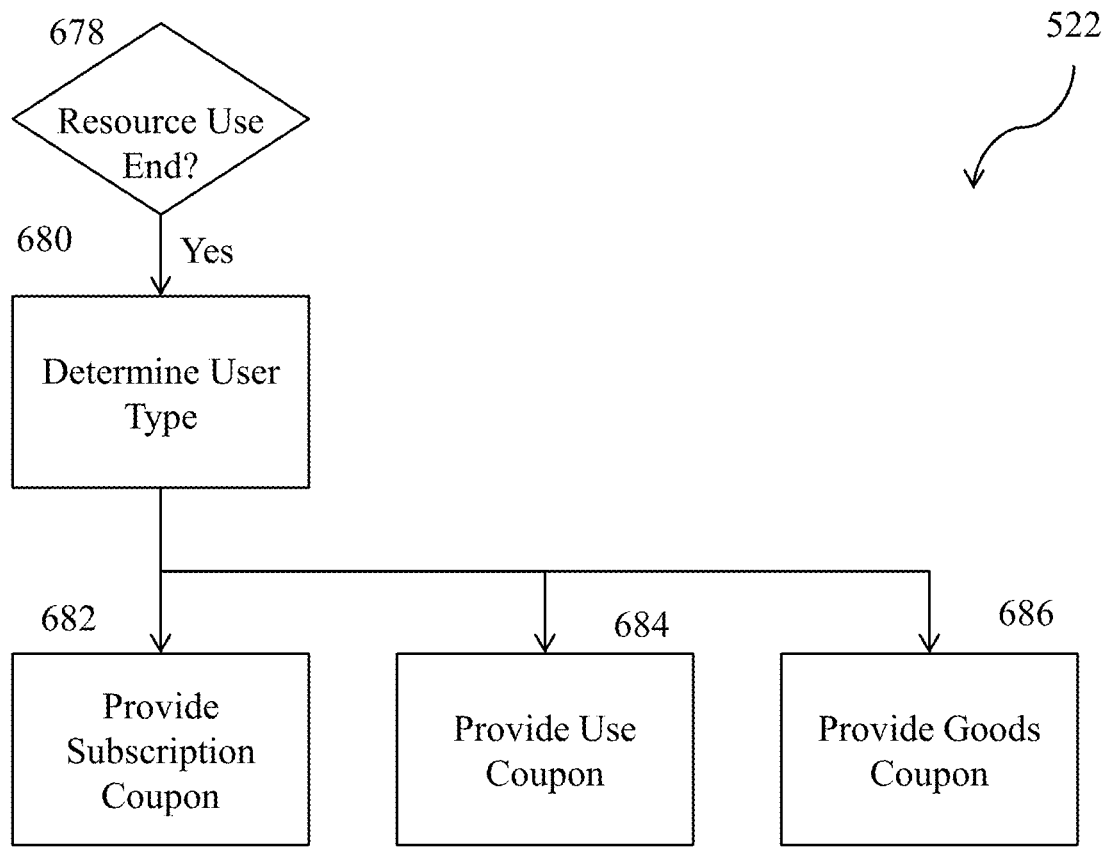
FIG. 12 shows a flowchart of an exemplary set of steps that the deployment system may perform to provide benefits related to resource use.

FIG. 12 shows an exemplary set of steps (block 522) that the deployment system (40) may perform to provide benefits related to resource use. When a user's use of a resource ends (block 678), the deployment system (40) may determine a user type for that user based upon the manner in which they accessed the resources (426). For example, some users may access the resources (426) based upon a subscription or prior purchased, while other users may purchase access from a kiosk or other device at the mobile facility (408).

Based upon this user type, the deployment system (40) may provide one more benefits to that user in the form of digital coupons and offers or printed coupons and offers. For example, users such as a subscription user may be provided (block 684) an email or electronic message containing a digital coupon for services or goods (block 686) that may be used to receive free or reduced cost purchase of the secondary resources (434), free or reduced cost use of the resources (426), or free or reduced cost purchase of the secondary goods (436). In such a scenario, upon completing use of the resource, the subscribing user may receive an email, text, or application notification via a device such as the user device (100) containing information that they can use to receive a free bottled water from the secondary goods (436) and connect to a Wi-Fi hotspot centered on the mobile facility (408), as well as a digital code that they can use to allow a friend or other person to access the resource (426) once for free.

Users such as new users or non-subscribing users may receive a printed coupon if they have not yet provided any electronic contact information. The printed coupon may contain a code, key, optical identifier, or other information that may similarly be used to receive free or reduced cost resource use or purchase of goods. New or non-subscribing users may additionally be provided (block 682) a printed or digital coupon usable to subscribe to or purchase future access to the resources (426) at a reduced cost or special subscription.

VI. Exemplary Methods for Providing Facility Access to Aging Population

Convenient and accessible facilities and resources are especially important for aging populations within cities and communities. Whether due to reduced mobility, dementia, fatigue, or declining eyesight, finding and accessing facilities and resources such as restrooms, water fountains, and rest areas can be an uncomfortable and stressful experience for humans as we age. As cities have become increasingly connected in terms of wireless communication, scooter and bike rentals, and technology software platforms, ease of city life has increased for some. Many of these solutions, however, are marketed towards and designed for younger populations, and may as a result be difficult for aging populations to interact with and utilize.

Some technology platforms, such as the system (10) and the deployment system (40) may advantageously provide an improved user experience for aging populations through interfaces and other features. For example, the interface of FIG. 3A may provide additional search capabilities directed at those in an aging population to help them identify appropriate facilities and resources that may be accessed without requiring that stairs be climbed, facilities that offer wheelchair access or other amenities, and facilities that are aesthetically designed and marketed towards an aging population rather than a young population. In this manner, someone within an aging population can find and access a facility that is more conducive to providing a user experience that is designed to meet their special needs. For example, these facilities may accommodate extended stays, on-call care provider consults, and an ability to notify emergency assistance.

As another example, the user (412) of the deployment system (40) may be able to request that a mobile facility be deployed nearby that has improved accessibility for an aging population, which may include a wheelchair lift, additional handrails, lower stair height, or other design features. Such a mobile facility may be designated different when it is displayed on a map such as that shown in FIG. 3A and may also be described differently when deployment notifications are provided (block 654).

Figure 3A:
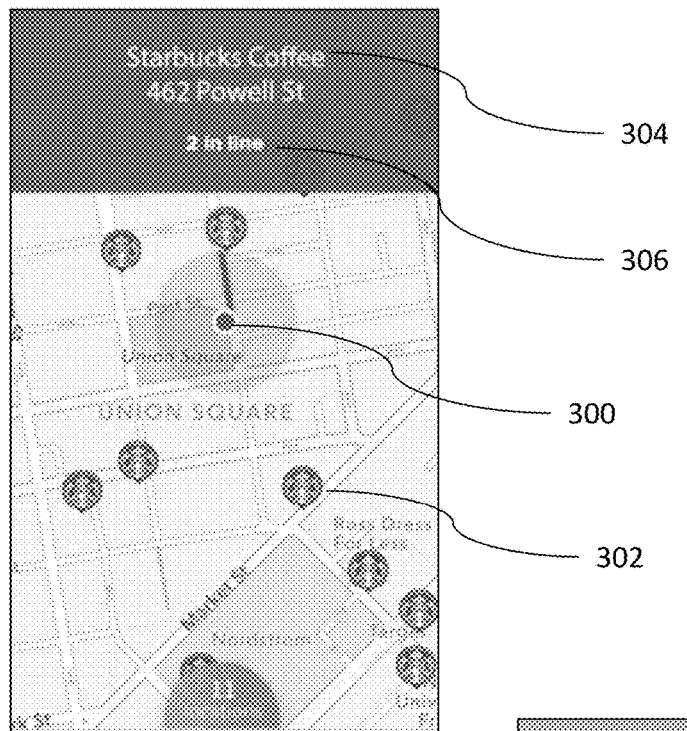
FIG. 3A shows a screenshot of an exemplary interface for choosing a facility.
Figure 3B:
FIG. 3B shows a screenshot of an exemplary interface for signaling arrival at a facility.
Figure 3C:
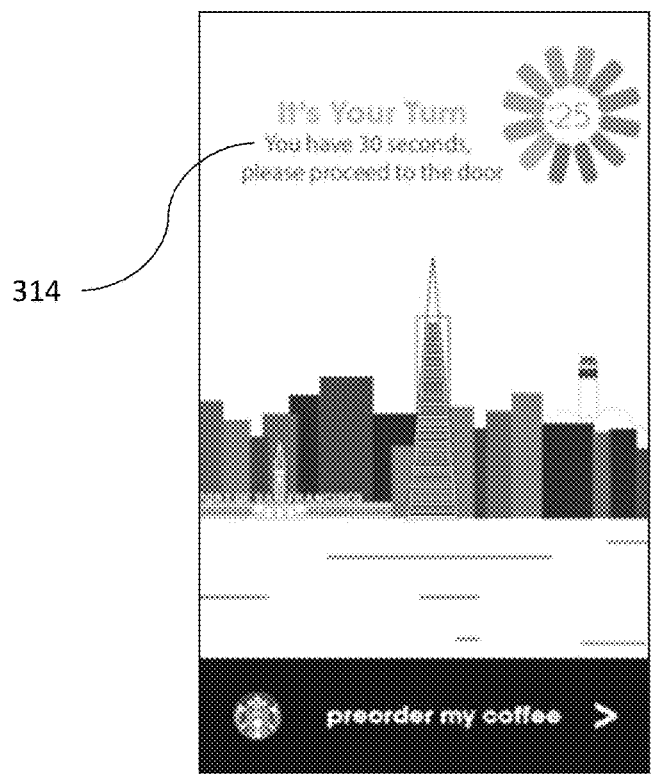
FIG. 3C shows a screenshot of an exemplary interface for signaling the facility is available.
Figure 3D:
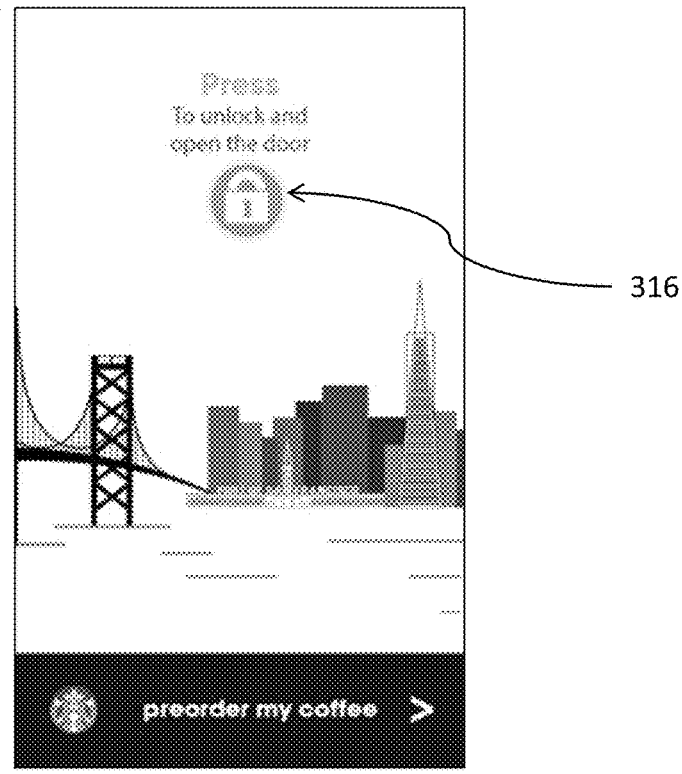
FIG. 3D shows a screenshot of an exemplary interface for enabling and accessing a facility.

As another example, permanent facilities and mobile facilities that are displayed on a map such as that shown in FIG. 3A may have additional icons or information indicating that a human attendant is at or near the facility and available to provide assistance in accessing and exiting the facility, using resources contained therein, and providing other general assistance if needed.

As another example, a user device such as the user device (100), a wearable device, or another device that the user (412) possesses may be used to pro-actively provide locations and access to facilities and resources, as well as to pro-actively provide electronic communications and requests to distribute or deploy facilities such as the mobile facility (408) for aging populations. In some implementations, a user may possess a wearable device or other personal device that uses factors such as time, fluid intake, perspiration, body temperature, and other detectable physiological states and information in order to predict imminent or future need of facilities and resources. One such wearable device may be an external patch or other electronic device worn on the body that can estimate and determine bladder size and contents, which may be an indicator of a future need for a restroom. Such a device may be configured to communicate with (i.e., directly, or through a device such as the user device (100)) the deployment system (40), the access server (114), or both, in order to identify and provide access to nearby facilities and resources. Access may be provided by way of a pro-active notification, such as a message via the user device (100) of a nearby permanent facility, or a notification of a recently distributed and deployed mobile facility.

VII. Exemplary Access Management Kit

A system such as that described in the context of FIG. 1 may be advantageously configured to allow for varying ways in which a facility or resource can be made available via the access server (114). For example, in some implementations each facility or resource may be owned, administrated, installed, or otherwise provided by the administrator of the access server (114), such that new facilities may be installed, configured, and made available via the access server (114) by that administrator. In some such implementations, facilities and resources may also be configured and added to the access server (114) in an automated or semi-automated manner.

This may be useful where, for example, an administrator of the access server (114) may provide bundles kits of devices and software that may be purchased by end-user installers, and installed and configured on a variety of facilities in order to add them to the access server (114). Such a kit may comprise, for example, the automatic opener (101), the automatic locking mechanism (102), the access panel (104), and the access manager (110). These devices may be installed and configured on a door of their facility to allow it to automatically open, close, lock, and unlock the door in response to commands from the access manager (110) and the access panel (104).

The access server (114) may be configured to detect when installation of the kit is complete. For example, the access manager (110) in each kit may be configured with unique information identifying that kit. When the access manager (110) is installed, it may connect to an internet network and communicate with the access server (114) in order to provide the unique identifier and other information verifying proper installation of the kit. Such information may include diagnostic checks and tests of the automatic opener (101), the automatic locking mechanism (102), and the access panel (104). Such information may also include a verifying code or passkey provided by an installing technician.

In response to receiving such information verifying installation, the access server (114) may automatically register the newly installed facility, and may make it available for search and access via the user device (100), so that it may be viewed and selected via interfaces such as those shown in FIGS. 3A-3D. Operating in this manner, such a kit may be provided to end users through a variety of commercials means (e.g., online orders, home improvement retail stores) and provide a high level of scalability as compared to a system where each facility is either partially or entirely managed by an administrator of the access server (114).

VIII. Miscellaneous

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

The invention claimed is:

1. A real-time adaptive facility deployment system comprising:
(a) an adaptive resource server comprising a processor and configured to store a facility dataset comprising information associated with a plurality of mobile facilities;
(b) each of the plurality of mobile facilities comprising a resource and an access manager, wherein the resource comprises a restroom, wherein the access manager is communicatively coupled with the adaptive resource server, and wherein each of the plurality of mobile facilities is adapted to be transported to a destination point and deployed for use; and
(c) a plurality of transport communication devices, wherein each of the plurality of transport communication devices is communicatively coupled with the adaptive resource server and associated with a mobile facility of the plurality of mobile facilities;
wherein the processor is configured to:
(i) receive a set of resource demand information that describes demand for the resource across a geographic area,
(ii) receive a set of resource availability information that describes availability for the resource across the geographic area,
(iii) determine a disparity associated with the resource for a demand zone within the geographic area based on the set of resource demand information and the set of resource availability information, and
(iv) provide a distribution signal to a transport communication device of the plurality of transport communication devices based on the disparity and the demand zone, wherein the distribution signal is associated with positioning a mobile facility that is associated with the transport communication device at a distribution point relative to the demand zone;
wherein the adaptation to each of the plurality of mobile facilities comprises:
(A) a facility structure comprising a set of wheels, and
(B) a facility transport that is operable to transport that mobile facility to the destination point, wherein the facility transport comprises an autonomous driving system, and wherein the distribution signal is configured to cause the autonomous driving system to pilot the facility transport to the distribution point.

2. The system of claim 1, wherein the processor is further configured to:
(i) identify a resource request for the resource within the geographic area, (ii) determine a deployment point based on the resource request, and
(ii) provide a deployment signal to the transport communication device, wherein the deployment signal is associated with deploying the mobile facility at the deployment point so that the resource is usable.

3. The system of claim 2, wherein the processor is further configured to, when identifying the resource request:
   (i) receive a direct request from a user device, the direct request comprising a location of the user device within the geographic area and an identification of a user associated with the user device, and, in response to the direct request, determine the deployment point based on the location of the user device, and
   (ii) determine that the disparity has exceed a configured threshold and, in response, generate an adaptive resource request and determine the deployment point based on the demand zone.

4. The system of claim 3, wherein the processor is further configured to:
   (i) determine that the mobile facility is not needed at the deployment point based on an updated disparity associated with the resource and the demand zone, and
   (ii) in response, provide a recall signal to the transport communication device that is associated with positioning the mobile facility at an updated distribution point.

5. The system of claim 2, wherein the processor is further configured to, in response to identifying the resource request, identify the mobile facility within the plurality of mobile facilities based on proximity to the demand zone.

6. The system of claim 2, wherein the processor is further configured to:
   (i) select the distribution point relative to the demand zone based on a preconfigured preferred distribution point proximate to the demand zone, and
   (ii) select the deployment point relative to the demand zone based on a preconfigured preferred deployment point proximate to the demand zone.

7. The system of claim 2, wherein the processor is further configured to, when the resource request is a direct request received from a user device:
   (i) display an initial cost associated with deployment of the mobile facility on the user device;
   (ii) provide a deployment notification to a plurality of user devices located within a configured proximity of the deployment point;
   (iii) track a number of users that access and use the mobile facility while it is located at the deployment point; and
   (iv) display a final cost associated with the deployment of the mobile facility on the user device based on the initial cost and the number of users that access and use the mobile facility at the deployment point.

8. The system of claim 1, wherein the set of resource demand information comprises a social media data stream, a first-party data stream, and a third-party data stream.

9. The system of claim 8, wherein:
   (i) the social media data stream comprises information received from social media postings that describe or are associated with the geographic area,
   (ii) the third-party data stream comprises information received from a ride sharing provider that indicates a high number of passengers traveling to the geographic area, and
   (iii) the first-party data stream comprises information received from a facility access system that manages access to the resource at statically positioned private facilities.

10. The system of claim 1, wherein the processor is further configured to, when determining the disparity:
    (i) generate a resource map that describes the availability of the resource across the geographic area,
    (ii) generate a demand map that describes the demand for the resource across the geographic area, and
    (iii) compare the demand map to the resource map in order to determine locations of one or more demand zones within the geographic area.

11. A method for adaptive deployment of a mobile facility comprising:
    (a) at an adaptive resource server, storing a facility dataset comprising information associated with a plurality of mobile facilities, wherein each of the plurality of mobile facilities comprises a resource and an access manager, wherein the resource comprises a restroom, wherein the access manager is communicatively coupled with the adaptive resource server, and wherein each of the plurality of mobile facilities is adapted to be transported to a destination point and deployed for use;
    (b) at the adaptive resource server, receiving a set of resource demand information that describes demand for the resource across a geographic area;
    (c) receiving a set of resource availability information that describes availability for the resource across the geographic area;
    (d) determining a disparity associated with the resource for a demand zone within the geographic area based on the set of resource demand information and the set of resource availability information;
    (e) providing a distribution signal to a transport communication device of a mobile facility of the plurality of mobile facilities based on the disparity and the demand zone, wherein the distribution signal is associated with positioning a mobile facility that is associated with the transport communication device at a distribution point relative to the demand zone; and
    (f) in response to identifying a resource request for the resource within the geographic area, providing a deployment signal to the transport communication device, wherein the deployment signal is associated with deploying the mobile facility at a deployment point relative to the demand zone so that the resource is usable;
    wherein the adaptation to each of the plurality of mobile facilities comprises:
       (A) a facility structure comprising a set of wheels, and
       (B) a facility transport that is operable to transport that mobile facility to the destination point, wherein the facility transport comprises an autonomous driving system, and wherein the distribution signal is configured to cause the autonomous driving system to pilot the facility transport to the distribution point.

12. The method of claim 11, wherein the distribution point is a preconfigured position that is selected from a plurality of positions based upon the demand zone.

13. The method of claim 12, wherein the deployment point is a preconfigured position that is selected from the plurality of positions based upon:
    (i) the location of the demand zone when the resource request is an adaptive resource request, and
    (ii) the location of a user device when the resource request is a direct request received from the user device.

14. The method of claim 11, further comprising, after the mobile facility is deployed at the deployment point, providing a notification to a plurality of user devices located within a configured proximity of the deployment point, wherein the notification indicates the location of the deployment point.

15. The method of claim 11, further comprising, when the resource request is a direct request received from a user device:
   (a) displaying an initial cost associated with deployment of the mobile facility on the user device;
   (b) tracking a number of other users that access and use the mobile facility while it is located at the deployment point; and
   (c) displaying a final cost associated with the deployment of the mobile facility on the user device, wherein the final cost is determined based upon the initial cost and the number of users that access and use the mobile facility at the deployment point.

16. The method of claim 11, further comprising, when providing the deployment signal to the transport communication device, selecting the mobile facility from plurality of mobile facilities based upon a proximity of the distribution point relative to the deployment point.

17. A real-time adaptive facility deployment system comprising:
   (a) an adaptive resource server comprising a processor;
   (b) a mobile facility comprising a resource, wherein the resource comprises a private restroom, an access manager, and an access restrictor, wherein access restrictor is operable to selectively allow access to the private restroom, wherein the access manager is communicatively coupled with the adaptive resource server, and wherein the mobile facility is adapted to be transported to a destination point and deployed;
   (c) a transport communication device associated with the mobile facility and in communication with the adaptive resource server; and
   (d) a user device in communication with the adaptive resource server;
   wherein the processor is configured to:
      (i) receive a set of resource demand information that describes demand for the resource across a geographic area, the set of resource demand information comprising a social media data stream and a first-party data stream,
      (ii) receive a set of resource availability information that describes availability for the resource across the geographic area, the set of resource availability information comprising a third-party data stream,
      (iii) determine a disparity associated with the resource for a demand zone within the geographic area based on the set of resource demand information and the set of resource availability information,
      (iv) provide a distribution signal to the transport communication device based on the disparity and the demand zone, wherein the distribution signal is associated with positioning the mobile facility at a distribution point relative to the demand zone,
      (v) provide a deployment signal to the transport communication device based on the disparity and the demand zone, wherein the deployment signal is associated with deploying the mobile facility at a deployment point relative to the demand zone so that the resource is usable,
      (vi) receive an access request from the user device via the access manager, the access request comprising a user identifier, and validate the access request based on the user identifier, and
      (vii) where the access request is valid, operate the access restrictor to allow access to the private restroom;
   wherein the adaptation to the mobile facility comprises:
      (A) a facility structure comprising a set of wheels, and
      (B) a facility transport that is operable to transport the mobile facility to the destination point, wherein the facility transport comprises an autonomous driving system, and wherein the distribution signal is configured to cause the autonomous driving system to pilot the facility transport to the distribution point.

* * * * *